US008104222B2

(12) United States Patent
Hovey

(10) Patent No.: US 8,104,222 B2
(45) Date of Patent: Jan. 31, 2012

(54) ANIMAL TRAP

(76) Inventor: David C. Hovey, Tuckahoe, NY (US)

( * ) Notice: Subject to any disclaimer, the term of this patent is extended or adjusted under 35 U.S.C. 154(b) by 150 days.

(21) Appl. No.: 12/462,164

(22) Filed: Jul. 31, 2009

(65) Prior Publication Data

US 2011/0023350 A1   Feb. 3, 2011

(51) Int. Cl.
*A01M 23/30* (2006.01)
(52) U.S. Cl. .................... 43/83.5; 43/81; 43/97
(58) Field of Classification Search ........... 43/73, 75, 43/77, 81, 81.5, 82, 83, 96, 97, 83.5
See application file for complete search history.

(56) References Cited

U.S. PATENT DOCUMENTS

| | | | | |
|---|---|---|---|---|
| 27,071 A * | 2/1860 | Ridley | ............. | 43/73 |
| 73,527 A * | 1/1868 | Guerrant et al. | ............. | 43/73 |
| 139,572 A * | 6/1873 | Gould | ............. | 43/73 |
| 200,930 A * | 3/1878 | Palmer | ............. | 43/75 |
| 487,593 A * | 12/1892 | Williams | ............. | 43/73 |
| 539,020 A * | 5/1895 | Andrews | ............. | 43/73 |
| 562,603 A * | 6/1896 | Harden | ............. | 43/73 |
| 689,641 A * | 12/1901 | Douthett | ............. | 43/73 |
| 840,673 A * | 1/1907 | Ward | ............. | 43/75 |
| 873,117 A * | 12/1907 | Brendt et al. | ............. | 43/75 |
| 873,331 A * | 12/1907 | Sletto | ............. | 43/75 |
| 874,335 A * | 12/1907 | Harden | ............. | 43/75 |
| 982,001 A * | 1/1911 | Hardegen | ............. | 43/73 |
| 1,040,478 A * | 10/1912 | Wilson | ............. | 43/73 |
| 1,059,114 A * | 4/1913 | Burke | ............. | 43/75 |
| 1,249,337 A * | 12/1917 | Cornelius | ............. | 43/75 |
| 1,288,777 A * | 12/1918 | Werts et al. | ............. | 43/75 |
| 1,362,953 A * | 12/1920 | Medzela | ............. | 43/73 |
| 1,399,965 A * | 12/1921 | Kent | ............. | 43/73 |
| 1,432,550 A * | 10/1922 | Hampton | ............. | 43/73 |
| 1,442,252 A * | 1/1923 | Coleman | ............. | 43/73 |
| 1,466,520 A * | 8/1923 | Beauchamp | ............. | 43/75 |
| 1,471,090 A * | 10/1923 | Bender | ............. | 43/96 |
| 1,477,320 A * | 12/1923 | Danley | ............. | 43/75 |
| 1,501,463 A * | 7/1924 | Matejewski | ............. | 43/74 |
| 1,529,565 A * | 3/1925 | Addington | ............. | 43/75 |
| 1,620,950 A * | 3/1927 | Coffman et al. | ............. | 43/73 |
| 1,723,121 A * | 8/1929 | Barwicki | ............. | 43/74 |
| 1,755,947 A * | 4/1930 | Baker | ............. | 43/75 |
| 1,995,344 A * | 3/1935 | Gebhard | ............. | 43/81 |
| 2,096,368 A * | 10/1937 | Ward | ............. | 43/73 |
| 2,145,537 A * | 1/1939 | Young | ............. | 43/75 |

(Continued)

FOREIGN PATENT DOCUMENTS

EP    2149302 A2 *  2/2010

(Continued)

*Primary Examiner* — Darren W Ark
(74) *Attorney, Agent, or Firm* — Michael E. Zall

(57) ABSTRACT

An animal trap having a jaw pivotally mounted to a base that swings between cocked sprung positions. A spring means biases the jaw toward the sprung position. Cooperatively engaged drive and driven gears are mounted on the side of the base. The driven gear is releasably engaged to the jaw when the jaw is in the sprung position. A lever means is provided for the selective engagement with the drive gear. When the lever is engaged to the drive gear and rotated it causes the driven gear to rotate, pivoting the jaw to the cocked position. After the animal is trapped, the lever is engaged with the drive gear permitting the jaw to be pivotally moved to the cocked position and releasing the animal from the trap. An enclosure permits the animal to enter and step on the trigger member to spring the jaw.

13 Claims, 40 Drawing Sheets

U.S. PATENT DOCUMENTS

| | | | | |
|---|---|---|---|---|
| 2,169,783 | A | * 8/1939 | Allen | 43/75 |
| 2,199,167 | A | * 4/1940 | Brooks | 43/75 |
| 2,256,048 | A | * 9/1941 | Evans | 43/75 |
| 2,268,966 | A | * 1/1942 | Shiraishi | 43/73 |
| 2,416,481 | A | * 2/1947 | Hollenbeck | 43/81 |
| 2,492,957 | A | * 1/1950 | Blair | 43/81 |
| 2,578,762 | A | * 12/1951 | Torgeson | 43/73 |
| 2,684,553 | A | * 7/1954 | Schroeder | 43/81 |
| 3,045,384 | A | * 7/1962 | Gruschow et al. | 43/81.5 |
| 3,992,803 | A | * 11/1976 | Kaiser | 43/83 |
| 4,216,606 | A | * 8/1980 | Kaiser et al. | 43/83 |
| 4,253,264 | A | * 3/1981 | Souza | 43/73 |
| 4,550,524 | A | * 11/1985 | Goebel | 43/75 |
| 4,607,450 | A | * 8/1986 | Kaiser et al. | 43/83 |
| 4,669,216 | A | * 6/1987 | Moss | 43/73 |
| 4,852,294 | A | * 8/1989 | Langli | 43/81 |
| 5,148,624 | A | * 9/1992 | Schmidt | 43/81 |
| 5,172,512 | A | * 12/1992 | Bodker et al. | 43/81 |
| 5,267,411 | A | 12/1993 | Phillips et al. | |
| 5,706,601 | A | 1/1998 | Dail | |
| 6,199,314 | B1 | * 3/2001 | Ballard | 43/97 |
| 2010/0018105 | A1 | * 1/2010 | Gauker et al. | 43/81 |

FOREIGN PATENT DOCUMENTS

| | | |
|---|---|---|
| FR | 2648314 A1 * | 12/1990 |
| GB | 2332356 A * | 6/1999 |
| WO | WO 9700607 A1 * | 1/1997 |
| WO | WO 2005074680 A1 * | 8/2005 |
| WO | WO 2005099451 A1 * | 10/2005 |

* cited by examiner

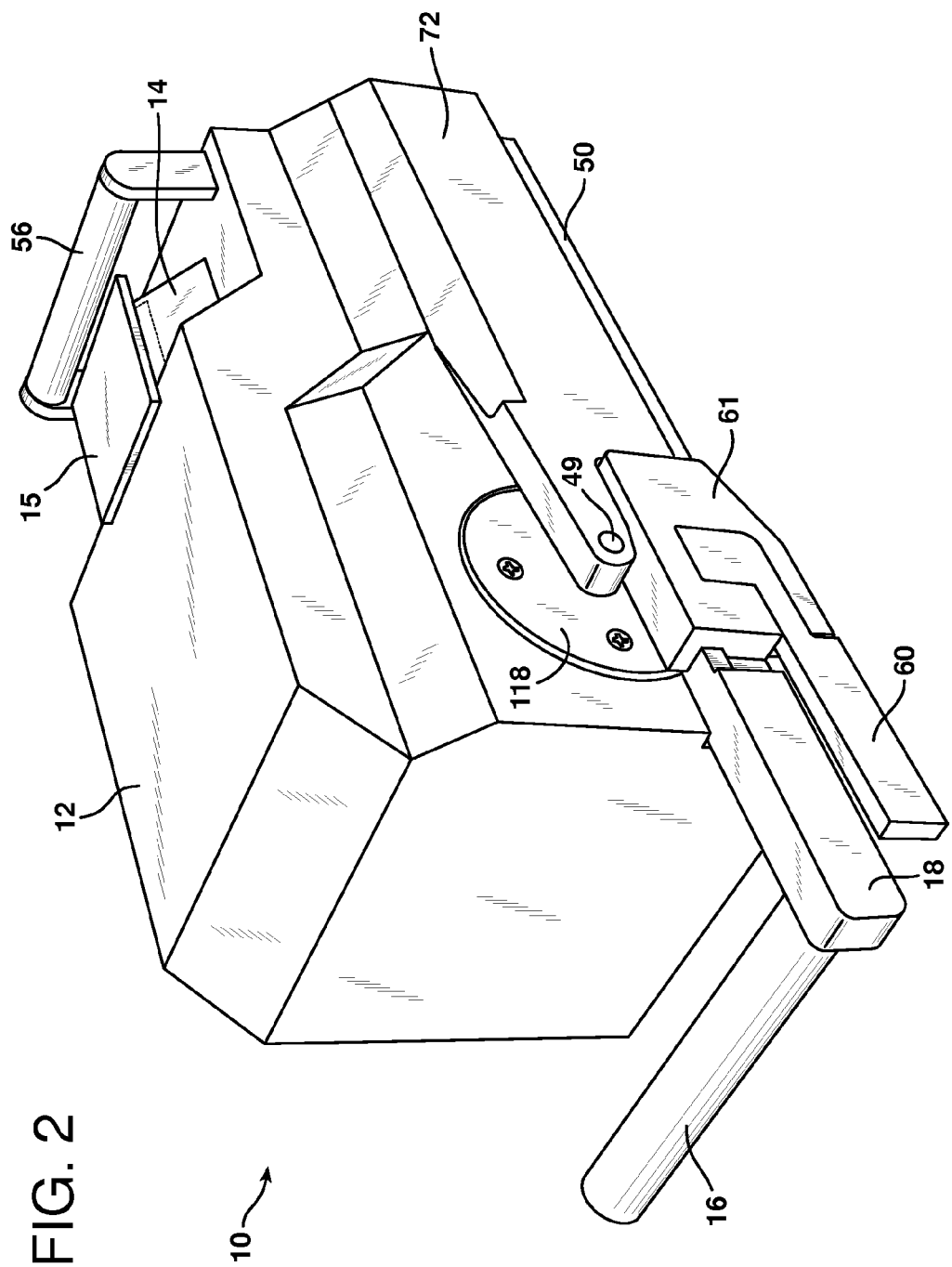

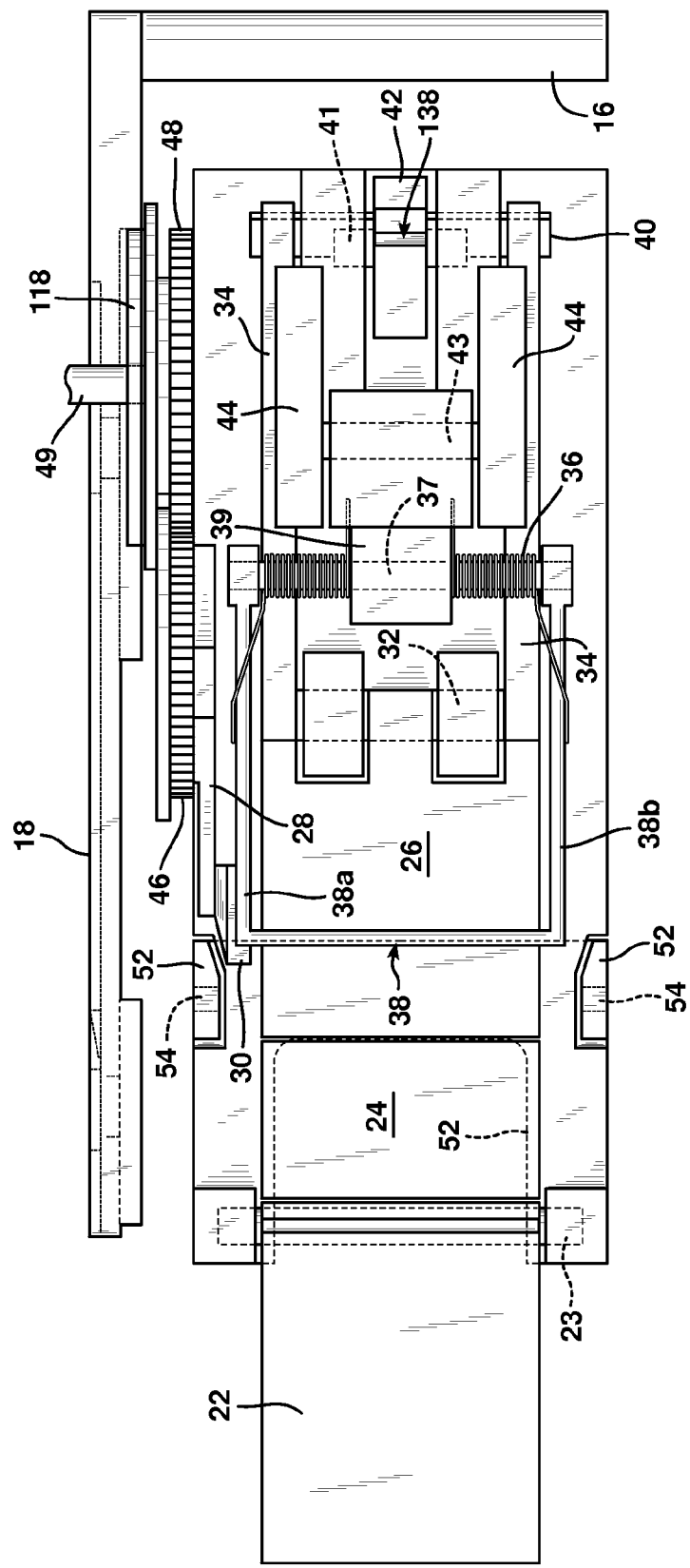

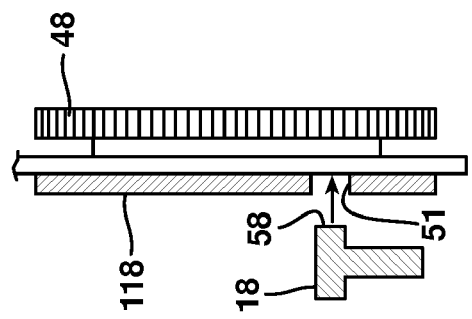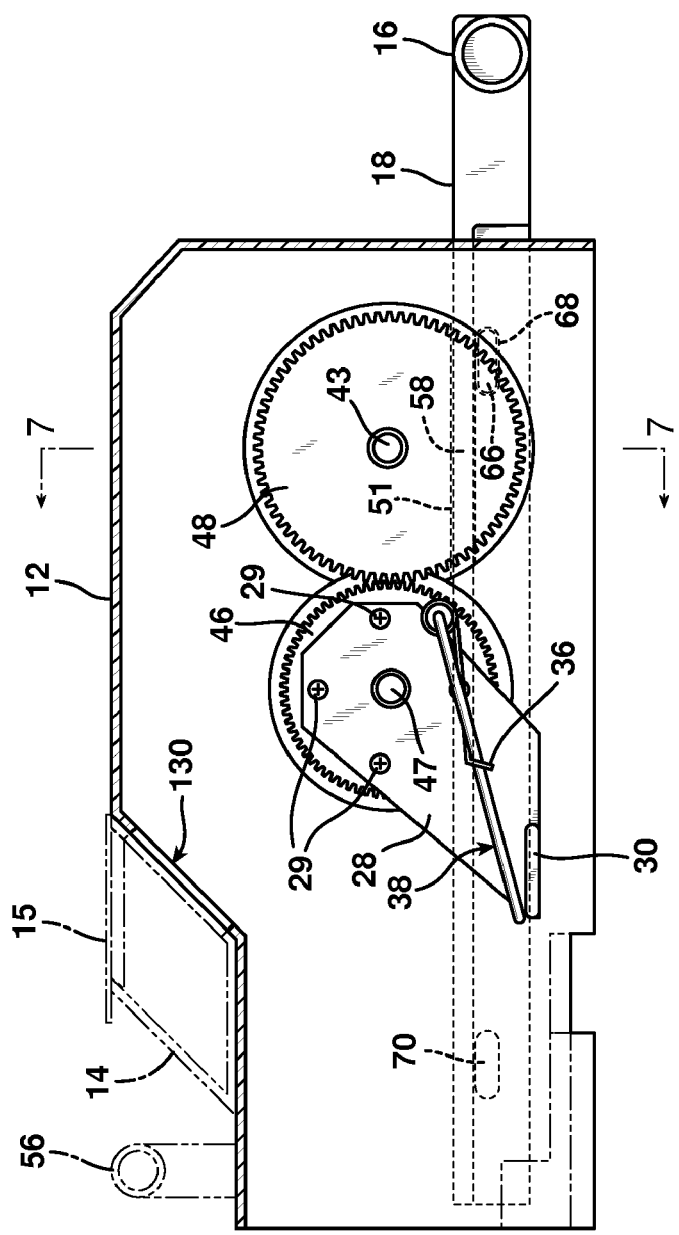

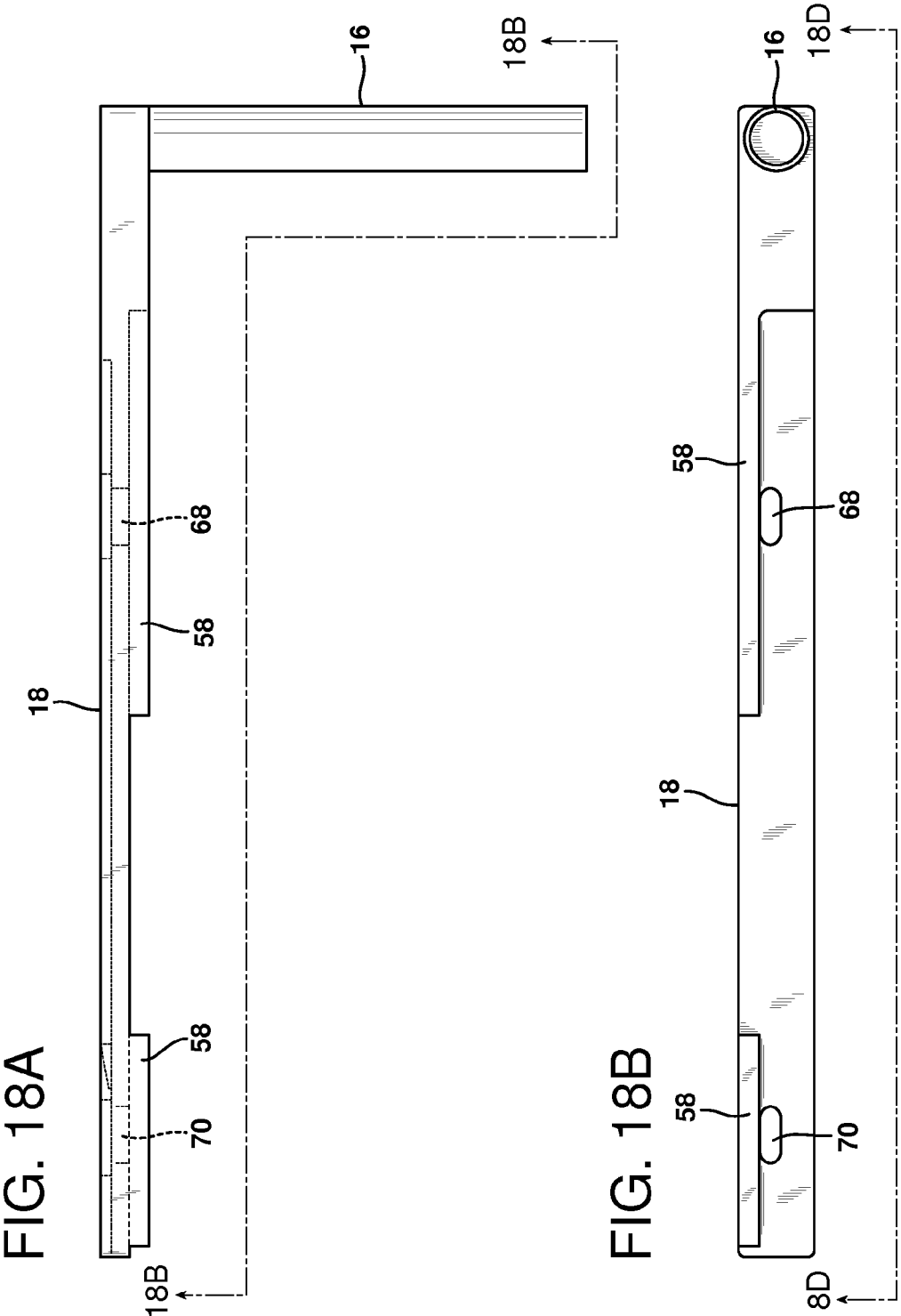

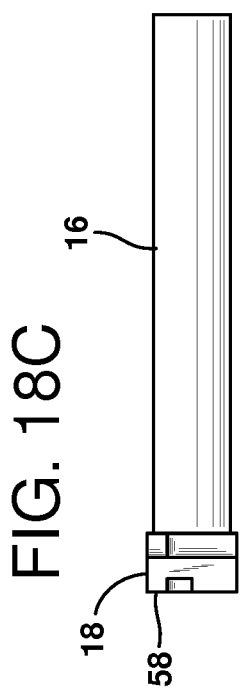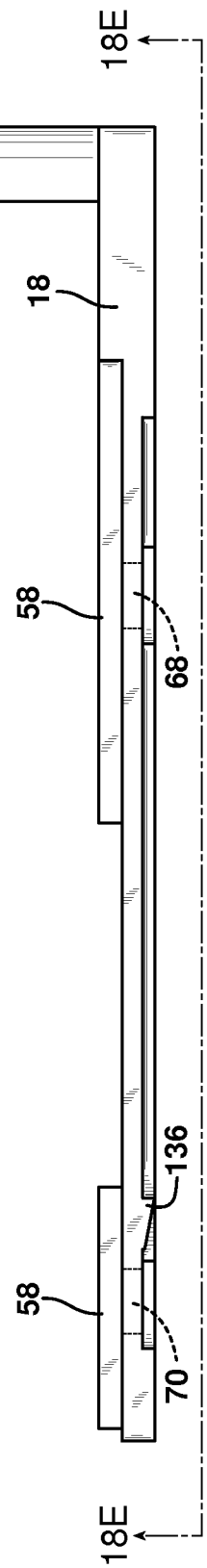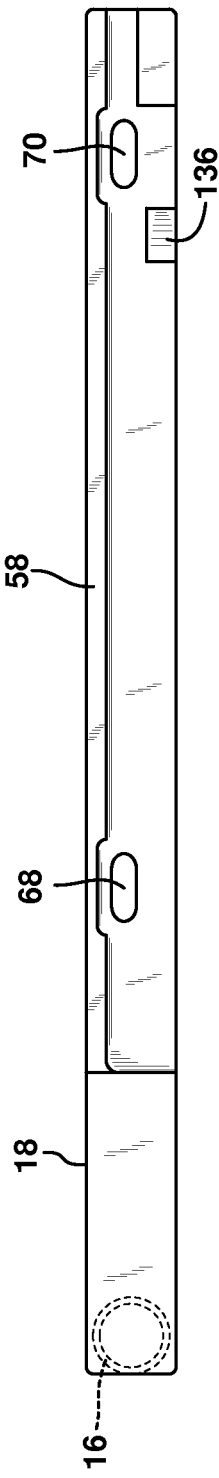

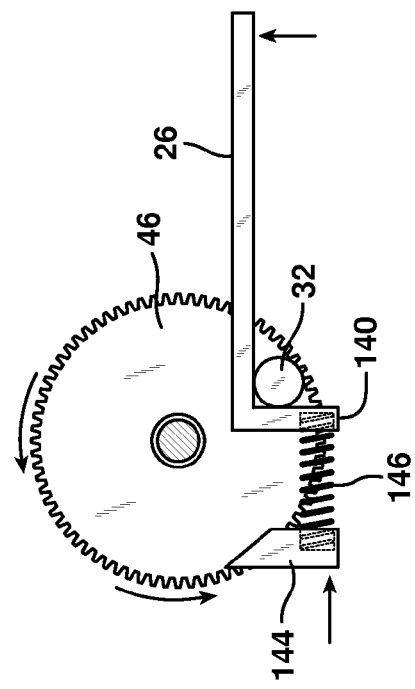
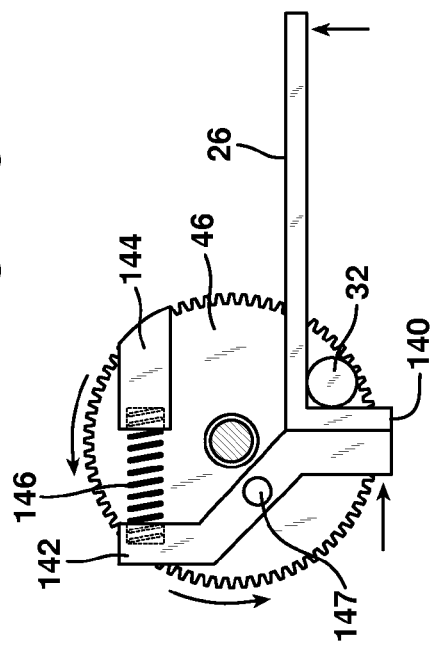
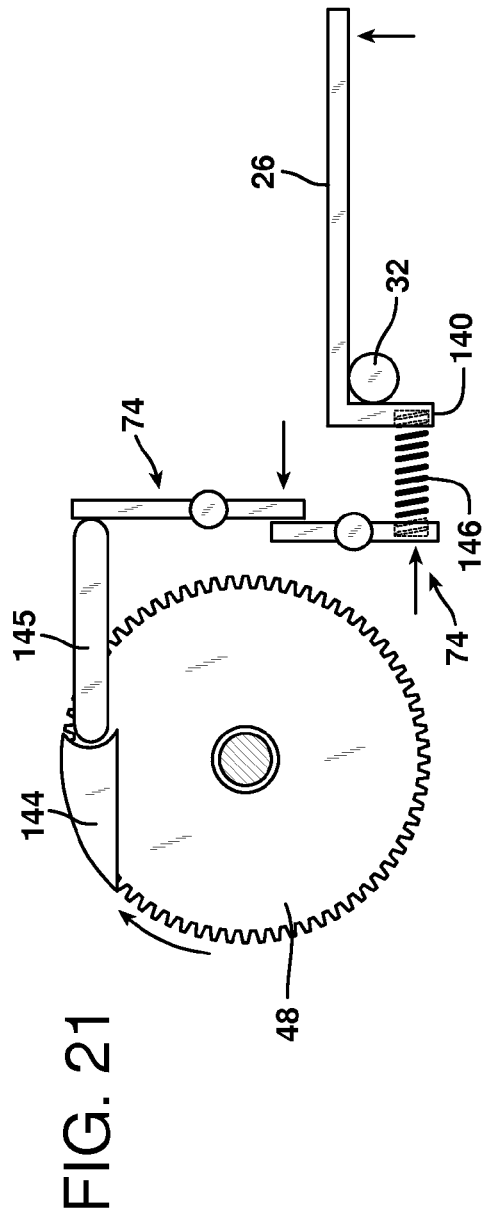

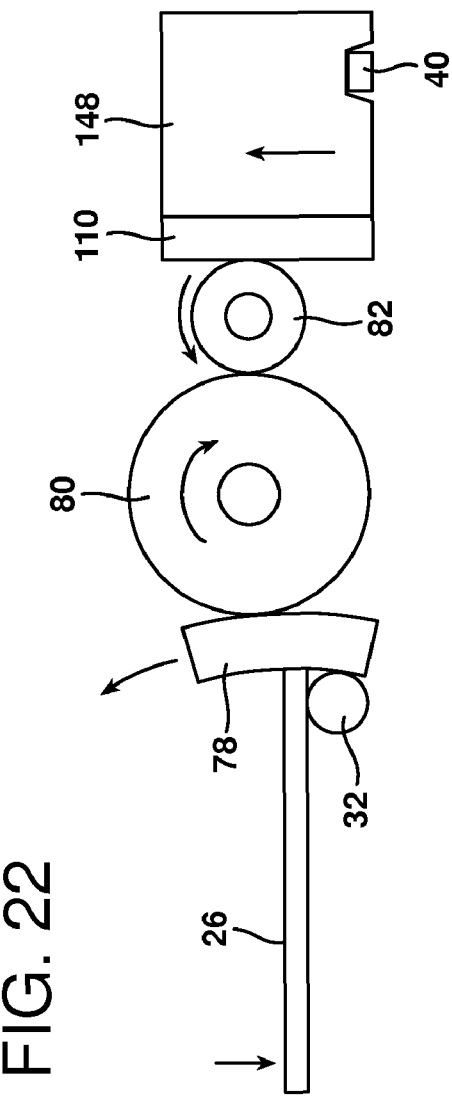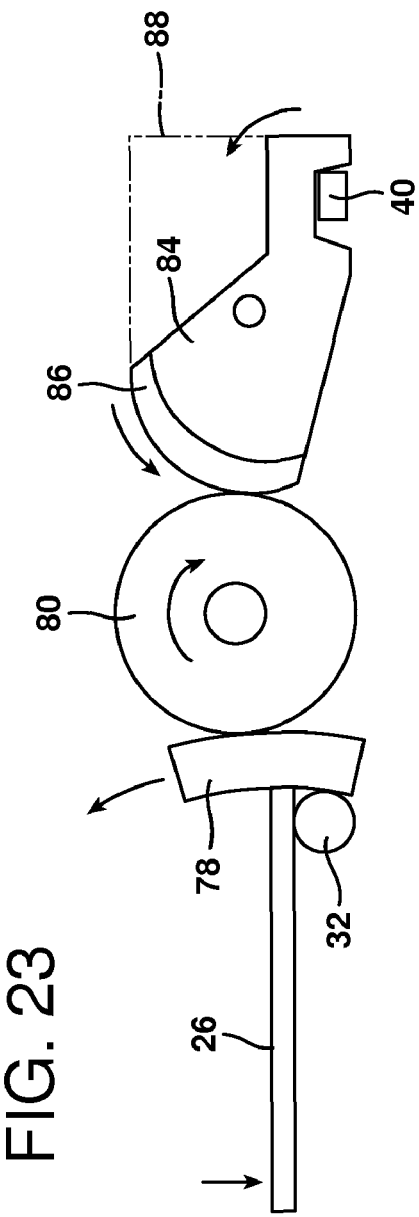

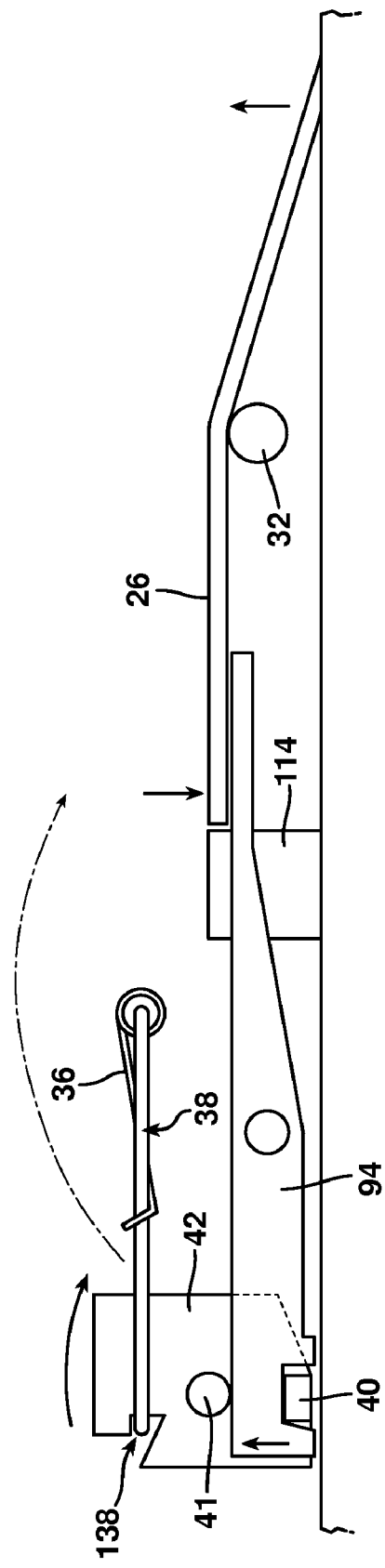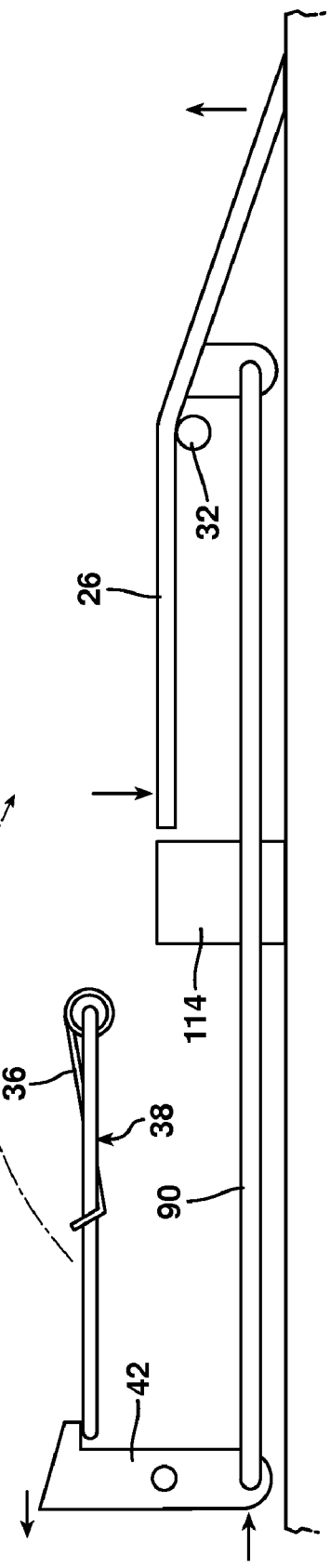

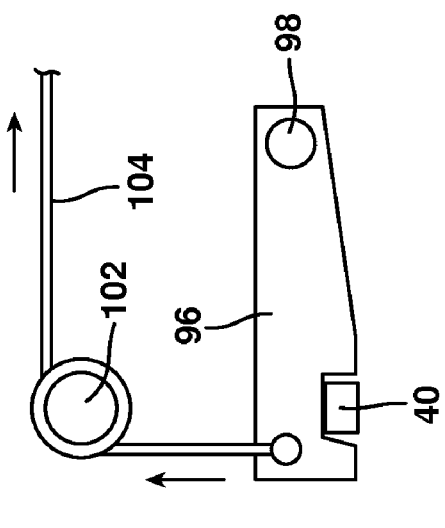
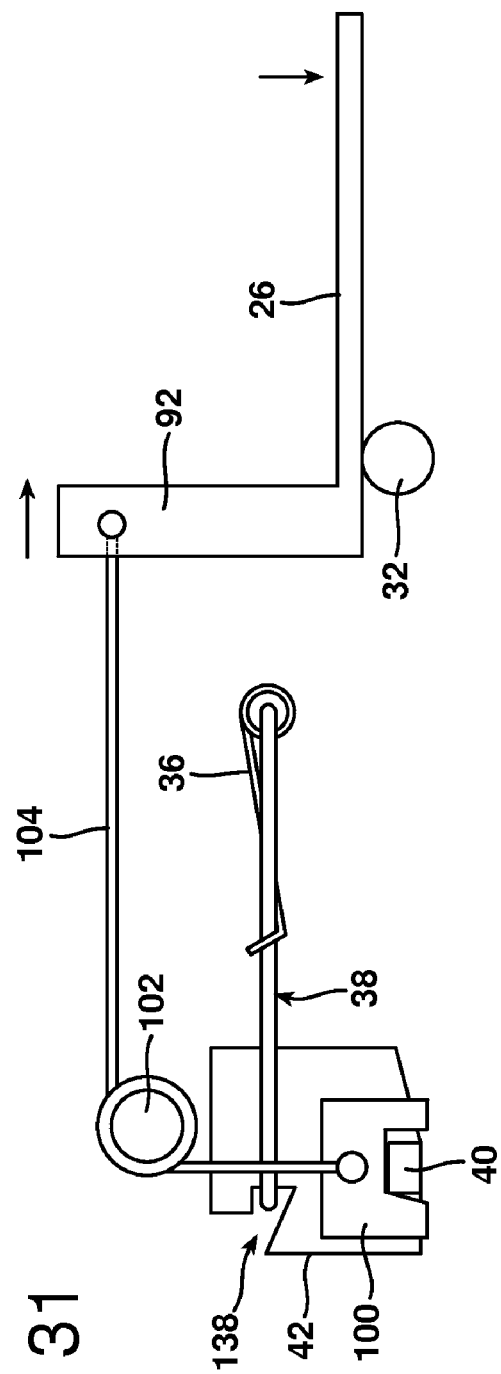
FIG. 30
FIG. 31

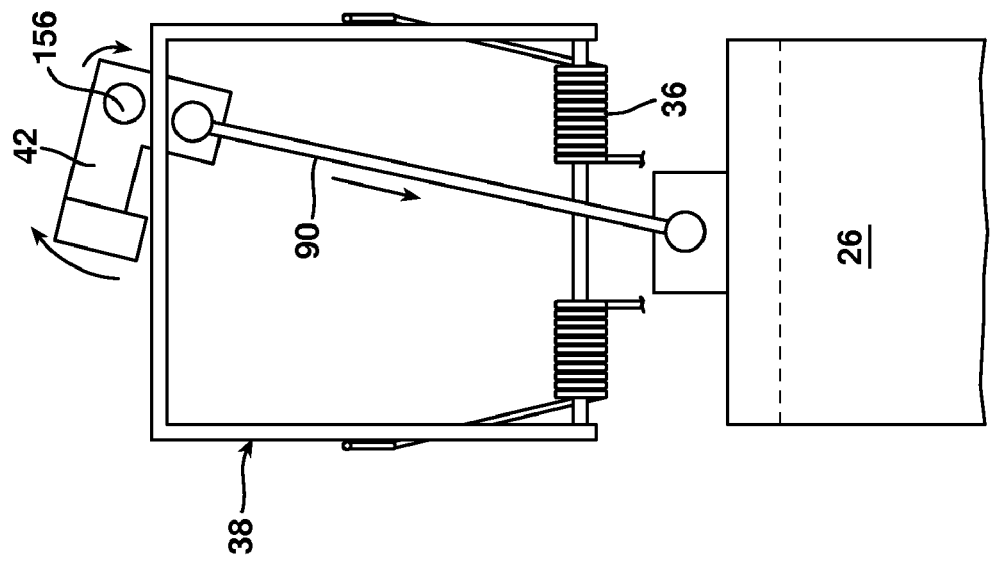
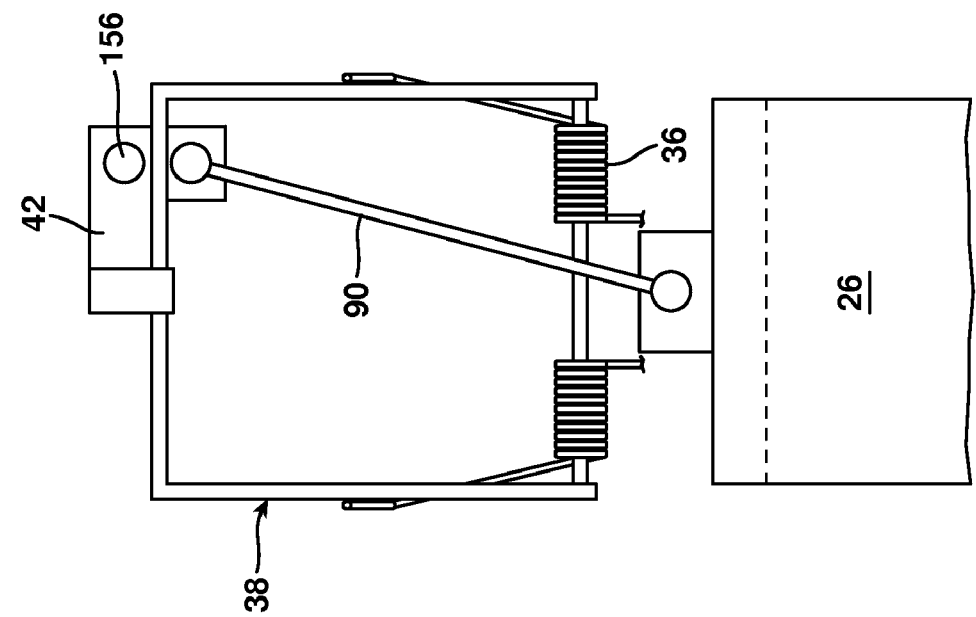

ANIMAL TRAP

BACKGROUND OF THE INVENTION

1. Field of the Invention

This invention relates to an animal trap, preferably used to trap rodents such as mice and rats. More particularly, this invention relates to an improved animal trap that includes a trap mechanism which can be set without risking bodily harm, a handle that is remote from a jaw of the trap mechanism that can be used to set the trap and release and discard the trapped, dead animal and an enclosure for the trap mechanism that has a bait container exterior to the enclosure for ease of baiting and reuse of the bait.

2. Description of the Related Art

Animal traps, and in particular mouse traps have been designed in many ways throughout the years. The most popular conventional, mouse trap includes a bar that is spring-mounted to a wood base, the bar and the base forming jaws in which the bar can be moved from a cocked position to a released position when the mouse touches the trigger arm. A larger version may be used for rats.

Unfortunately, there are many disadvantages connected with this type of trap. For example, there is a risk of a user hurting his fingers while trying to set the mouse trap in the cocked position. Additionally, the locking devices for such traps are very sensitive and apt to accidentally unlock and release the striker. Because of the open exposure of the trap mechanism, it is dangerous to use a spring-loaded type of trap in places where there are small children and pets that can accidentally trigger the trap and catch their extremities therein.

Additionally, many of the prior art traps are hazardous to the hands and fingers of the trap setter since it is usually necessary to place the hands and fingers in the path of the spring mounted jaw during setting. The catch mechanism can be unreliable or difficult to secure and the catch mechanism releases the jaw to snap shut before the person setting the trap can remove all his/her body portions from the path of the jaw. Often, a catch mechanism may be too sensitive to be usable or too insensitive to respond to rodent approaches or taking the bait on the trap.

Yet another problem associated with conventional type traps is that the mechanism and the method used to trip or release the striker are unreliable. Typically, downward pressure, from the animal's head is required to cause the release of the striker. In practice, much of the bait can be consumed without providing the necessary pressure to cause the tripping of the release mechanism.

Another problem associated with conventional type traps are that rats and mice are especially attracted to peanuts and peanut butter. Attempting to attach these type baits to a conventional trap's bait station is difficult, messy and hazardous.

Another problem frequently encountered with known traps, is that the release of the trapped animal from the trap is usually a messy, unsanitary, and difficult process. Normally this process involves grasping the jaw (or jaws) which killed the animal and moving the jaw to release the animal from the trap. This entails the unsanitary act of touching the jaw in the vicinity of the dead animal and sometimes even requires touching the animal itself. Since rodents are noted carriers of germs and disease, it is completely undesirable to require a trap user to manipulate the trap in any way which places the user's hands in the area of the captured rodent. Moreover, because a captured rodent is usually severely injured, such a trapped animal usually presents a gory sight that is not well-received by a squeamish user. Thus, it would be desirable in an improved mousetrap to include a means for substantially shielding a dead, trapped animal from the user's sight and to enable the user to remove the captured animal without requiring the user to touch the dead animal or the trap areas in the immediate vicinity of the animal.

Another problem associated with known mousetraps is that the animal may approach the trap from different directions, thus limiting the effectiveness of the killing mechanism. Thus it is desirable to provide an animal trap which also limits an animals approach to a single deadly path for advancing upon the bait, so that all attempts to snag the bait will result in a captured animal.

There exists, therefore, a significant need for an improved animal trap that can be set easily without hazard to the user, that shields a captured animal from sensitive eyes while still providing an indication that the trap has sprung, and that allows disposal of the captured rodent in a sanitary way using a handle that is remote from the trap area holding the animal. Moreover, such an improved trap is needed which limits animals to a single deadly path for advancing upon the bait and which also addresses the other problems noted above. In a relatively inexpensive fashion, the present invention fulfills these needs and provides further related advantages.

The patent literature includes a host of animal traps, particularly for use in trapping rodents, see for example:

U.S. Pat. No. 1,399,965 to Kent describes a rat trap having a runway which is removably fitted to a cage and motor actuated means controllable by a platform located in the runway for forcing the rat into the cage when the rat occupies the platform, for automatically closing the cage so as to confine the animal therein and operable to re-set itself after each actuation.

U.S. Pat. No. 1,442,252 to Coleman describes an animal trap wherein after one animal has been caught, the animal caught automatically resets the trap to catch another animal, ad infinitum. The trap includes a plurality of compartments, one of which is provided with inlets and outlets and is provided with an animal controlled trip mechanism for closing the doors, the other compartment being in the form of a cage into which the animal passes after having been entrapped in the first compartment, and there being a mechanism associated with the outlet door which leads into the cage to prevent the animal from reentering the first compartment.

U.S. Pat. No. 1,466,520 to Beauchamp describes a spring loaded trap which can be attached to a barrel or box which when activated by the weight of the animal immediately dispatches (kills) the animal and automatically drops him into the barrel or box.

U.S. Pat. No. 1,501,463 to Matejewski describes a trap for mice, rats, or other animals, and that has an automatic trap which is spring operated and which can catch a number of animals in succession without injuring them. The trap uses of a spring operated rotary sweep which is released by the weight of the animal when it steps upon the bait treadle and which operates to sweep the-animal through the cage door. The trap is provided with an automatic locking means for rendering the parts inactive when the maximum number of animals has been caught.

U.S. Pat. No. 1,755,947 to Baker describes a trap having a casing having an entrance, a movable platform located within the casing, a striking element connected to be actuated by the movement of the platform, an ejecting means located in rear of and operated by the striking element to receive and throw out an animal which has been struck by the striking element, and means operable by the striking element for automatically setting the trap after the ejecting means has been operated.

U.S. Pat. No. 2,096,368 to Ward describes a revolving type animal trap with means for automatically resetting the trap after operation and the automatic dispatch and disposal of the animal from the trap.

U.S. Pat. No. 2,169,783 to Allen describes a rodent trap that is adapted for automatic, repeated operations to kill and eject a number of rodents in succession from the trap after an initial setting.

U.S. Pat. No. 2,256,048 to Evans describes an automatic resetting animal trap designed to strike the animal, knock it away from the trap and immediately reset itself automatically, and which delivers a blow upon the animal in a sweeping downward and horizontal direction, thus reducing any tendency for the animal to be carried into the trap to clog the operative mechanism thereof, while at the same time incorporating additional means for facilitating the ejection of the animal from the trap.

U.S. Pat. No. 2,416,481 to Hollenbeck describes an animal trap that can be permanently baited and can be easily cocked in the open position to trap the animal.

U.S. Pat. No. 2,684,553 to Schroeder describes a rodent trap that initially captures and subsequently kills the rodent and which does not use bait and wherein the rodent enters the trap due to curiosity and in so doing releases a closure for entrapping the rodent therein without initially harming the rodent. A spring jaw is arranged to strike and kill the rodent when the rodent attempts to escape through an opening in the trap.

U.S. Pat. No. 4,253,264 to Souza describes a repeating animal trap for rodents that has a trapping passageway into which animals are attracted. A trigger within the passageway is tripped by animal pressure and this sets in motion a reciprocatory sweeping mechanism which sweeps the animal from the passageway into an adjacent collecting compartment. The reciprocatory mechanism then returns to its initial position. The walls of the passageway effectively prevent the animal in the collection compartment from pushing its way back into the passageway.

U.S. Pat. No. 4,852,294 to Langli describes a rodent trap wherein a spring-loaded striker is maintained in a raised, loaded position by a release lever connectable with the striker through a projection and lug arrangement. A bottom opening is provided in the trap which receives the bait therein. The release lever is placed forwardly of the bait and in the path of movement of the rodent. The striker is mounted for arcuate movement. When a rodent engages the release lever, the striker and the release lever disengage thereby permitting the striker to rotate in an arcuate path to strike the rodent.

U.S. Pat. No. 5,148,624 to Schmidt describes a mousetrap that has a handle that is remote from the trapping mechanism so that the mousetrap may be set for use without endangering one's hands or fingers. The mousetrap includes a cover that serves to protect humans from the trapping mechanism, shield the captured animals from sight, define a single pathway for an animal to advance upon the bait on the mousetrap. The handle protrudes from the cover which encloses a spring-biased jaw frame, trigger, and catch member of the mousetrap.

U.S. Pat. No. 5,172,512 to Bodker describes a trap for catching mice and rats that includes a standard mousetrap mounted within a two-part housing. The standard mousetrap includes a tab which projects through a slot an arcuate upper wall of one portion of the housing, allowing one to cock the trap from the exterior of the housing. The first portion of the housing is pivoted to the second portion of the housing so that the housing can be conveniently opened to dispose of a mouse or rat caught in the trap. The housing shields the cocked trap so as to enhance the safety thereof while allowing one to empty the trap without running the risk of touching the mouse or rat caught therein.

U.S. Pat. No. 5,267,411 to Phillips describes a trap system that includes a housing in which a conventional spring-loaded trap is mounted. The housing defines a rodent access through which the rodent enters the housing. Rodent bait secured to the trigger of the trap entices the rodent to travel to and activate the trap. Upon activation, the trapping bar of the trap pulls the activation indicator into the housing to indicate that trap activation has occurred. The trap system includes an obstructor that hinders inadvertent activation of the trap during shipping.

U.S. Pat. No. 5,706,601 to Dail describes an animal trap in combination with an enclosure in the form of a plastic bag inside a cover. The enclosure is contoured so as to fit within the cover and has an open rear end to admit an entry therein of the rodent. When the rodent enters the enclosure and touches a pad end of the trigger member, the spring-loaded striker is released from a catch position and kills the rodent within the enclosure by entering the lower portion of the cover through two vertical slots without penetrating the enclosure. The enclosure is then pulled from the cover by the user and disposed of. The bag can be of the colored plastic type, so the user will not even see the mouse inside of it.

OBJECTS AND SUMMARY OF INVENTION

It is an object of the instant invention to provide a new and improved animal trap, particularly for rodents, wherein the trap is shielded to enhance safety for people and pets and allowing one to empty the trap without touching a dead animal.

It is an object of this invention to provide an animal trap which, while capable of easy springing by an animal, may be handled with little danger of it being sprung accidentally, and which if so sprung, offers no danger to the fingers or hands of the user.

It is another object of this invention to provide an animal trap, particularly a large rat trap, wherein the means for activating the trap uses a leverage system or an electric motor that easily overcomes the large resistance created by the powerful springs used in such a rat trap.

It is yet another object of this invention to provide an animal trap in which the operative parts thereof are enclosed in such a manner that the trap may be handled without the anticipation of springing, thus eliminating the fear of handling that is ordinarily present in connection with the setting of ordinary traps.

It is yet another object of this invention, to provide an animal trap with a separate bait container that can be filled and refilled with different type baits, e.g., peanuts, peanut butter which are not consumed by the animal and may be cleaned without contact with the area in which the animal was killed.

It is another object of this invention to provide a reliable means for releasing the striker by using the animal's body weight while it attempts to get at the out of reach bait.

It s another object of this invention to provide a means for safely releasing and disposing of the dead animal and resetting the striker.

It is yet another object of this invention to provide a means for setting the animal trap on the side of a trash can and after capture, safely releasing and disposing of the dead animal into the trash can without touching the animal and simultaneously resetting the striker.

It is also an object of the invention to provide a trap which is rugged, durable and operatively reliable, particularly in view of the repeated springing of the trap.

Yet another object of this invention is to provide a trap which is easy to load and prepare prior to setting it out.

Another object of the invention is to provide a simple, economical and readily portable, reusable animal trap which can operate in any convenient location without the need for any external power source.

It is another object of this invention to provide an animal trap which may also be used to catch valuable fur bearing animals.

All of the foregoing objects as well as others are achieved by the animal trap of this invention. Broadly, this invention is directed to an animal trap comprising:

a base having an upper surface, a bottom surface, a front portion, an opposed rear portion and opposed sides;

a jaw frame pivotally mounted on the upper surface of the base for pivotal movement between a cocked position proximate the rear portion of the base and a sprung position proximate the front portion of the base;

a spring means for biasing the jaw frame towards the sprung position;

a gear system mounted proximate one side of the base comprising a drive gear and driven gear cooperatively engaged with each other, wherein the driven gear is releasably engaged to the jaw frame when the jaw frame is in the sprung position;

a lever means for selective engagement with the drive gear;

a means for selectively engaging and disengaging the lever from the drive gear;

whereby when the lever is selectively engaged to the drive gear and is rotated from the rear portion to the front portion of the base, the drive gear is rotated toward the front causing the driven gear to rotate toward the rear to thereby pivot the jaw frame to the cocked position proximate the rear portion of the base;

whereby when the lever is selectively disengaged from the drive gear, the lever can be freely rotated from the front portion of the base to the rear portion of the base for repositioning the lever for selective engagement with the drive gear;

a catch means for releasably engaging the jaw frame when the jaw frame is rotated to the cocked position, wherein when the jaw frame is engaged by the catch means, the jaw frame is cooperatively disengaged from the driven gear;

a trigger member mounted to the top surface of the base proximate the front portion of the base and adapted for operative association with the catch means to force the catch means to release the jaw frame permitting the jaw frame to move to the sprung position when an animal steps on the trigger member to thereby trap the animal between the jaw frame and the top surface of the front portion of the base and to releasably engage the driven gear;

whereby when the lever is again selectively engaged with the drive gear, the jaw frame may be pivotally moved to the cocked position to simultaneously release the animal from the trap and cock the jaw frame;

an enclosure means having an interior and exterior surface mounted to the base for enclosing the trigger member and the catch means in the interior and having an opening in the enclosure to the interior, the enclosure being proximate the trigger member to permit the animal to enter the interior of the enclosure and step on the trigger member to spring the jaw frame to trap the animal between the jaw frame and the top surface of the front portion of the base.

Optionally, an electric motor may be used to rotate the drive gear.

Alternatively the drive gear and driven gear are rollers that are frictionally cooperatively engaged to each other. However it is preferred that the drive gear and driven gear each has teeth around the periphery thereof that cooperatively engage with the teeth of the other gear by the meshing of their respective teeth.

In a preferred embodiment, the lever is slidably mounted to a side of the drive gear and includes a handle at one end and the means for selectively engaging and disengaging the lever from the drive gear at the other end, the lever being slidable on the drive gear from an inactive unextended position wherein the lever is selectively disengaged from the drive gear and an extended active position wherein the lever is selectively engaged to the drive gear, whereby when the lever is selectively engaged to the drive gear and rotated from the rear of the base to the front of the base the drive gear is rotated toward the front causing the driven gear to rotate toward the rear to thereby pivot the jaw frame to the cocked position proximate the rear portion of the base.

The trap further includes a bait container mounted to the exterior surface of the enclosure proximate the trigger member, the bait container having an interior volume for enclosing bait, the interior volume being in air communication with the interior of the enclosure enabling the bait to be smelled by the animal when approaching the opening of the enclosure to thereby lure the animal onto the trigger member. The bait container preferably has a removable cap on an opening in the bait container for insertion of bait into the container.

In a preferred embodiment the trigger member is a platform cooperatively associated with the catch means to force the catch means to release the jaw frame, wherein when the jaw frame is cocked in the catch means the platform is spaced above the top surface of the base and when an animal steps on the platform it forces the platform to move toward the top surface of the base forcing the catch means to release the jaw frame to thereby trap the animal between the jaw frame and the platform.

The trap may further include a liner for the interior of the enclosure that prevents splatter and maintains the interior mechanism clean and coacts with the trap mechanism.

The trap may further include a bracket means mounted to the base for securing the trap to a support member, typically a garbage container. The bracket means is slidable between a first position wherein the bracket is substantially flush with the bottom surface of the base and a second position wherein the bracket extends from the bottom surface of the base for securing the trap to a support member.

The invention may be further understood by the description of the preferred embodiments, in conjunction with the drawings, which now follow.

BRIEF DESCRIPTION OF THE DRAWINGS

For a more complete understanding of the present invention, reference may be had to the following description of exemplary embodiments of the present invention considered in connection with the accompanying drawings, of which:

FIG. 2 is a rear perspective view of the embodiment of the animal trap of this invention depicted in FIG. 1.

FIG. 3 is a cut-a-way top plan view of the animal trap with the enclosure removed prior to activation.

FIG. 6 is a fragmentary side view of the animal trap detailing the striker 38 and drive/activating mechanism therefore.

FIG. 7 is a sectional view taken along line 7-7 of FIG. 6 showing the striker 38 and drive/activating mechanism therefore.

FIG. 18A is a top plan view of the crank handle 18 of the animal trap of this invention.

FIG. 18B is a side view of the crank handle 18 taken along line 18B-18B of FIG. 18A.

FIG. 18C is an end view of the crank handle 18 taken along line 18C-18C of FIG. 18B.

FIG. 18D is a bottom plan view of the crank handle 18.

FIG. 18E is a side view of the crank handle 18 taken along line 18E-18E of FIG. 18D.

FIGS. 19-21 show schematic views of differing embodiments for re-positioning the actuating platform of the trap of this invention after the trap has sprung.

FIGS. 22-35 are schematic views of various embodiments of the tripping mechanism used in the animal trap of this invention and elements therefore.

DETAILED DESCRIPTION OF THE INVENTION

The illustrated animal trap, is designed primarily for trapping rodents such as rats or mice, however it may be used for fur-bearing animals or other pests that can be attracted into the trap. In its preferred and illustrated use it is designed to eliminate rats.

Figure 1:
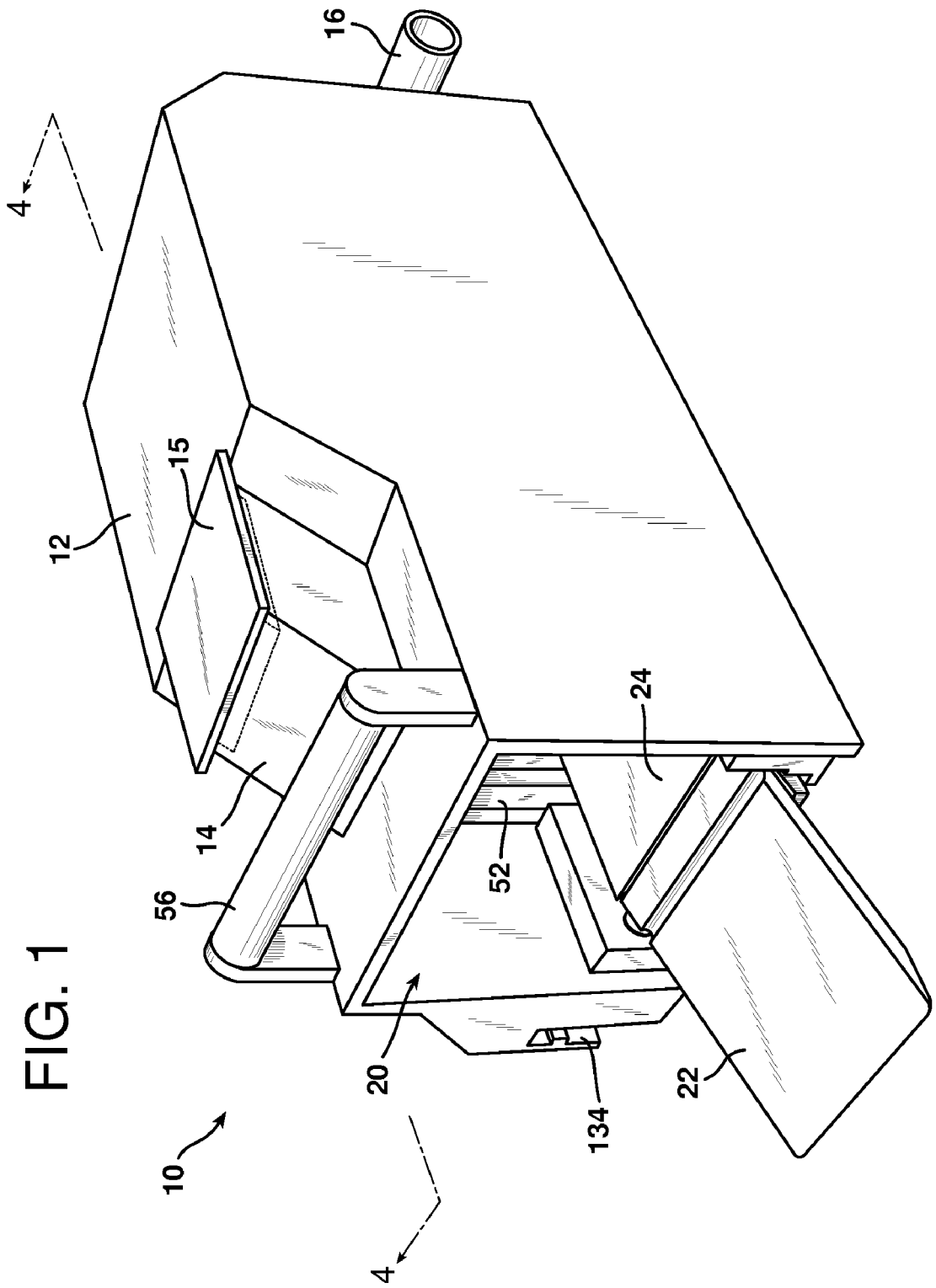
FIG. 1 is a front perspective view of an embodiment of the animal trap of this invention in position to trap an animal.

Referring to the Figures, in particular FIGS. 1 and 2, the animal trap of this invention 10 includes an enclosure 12. The enclosure 12 has one portion opened 20 for entrance of an animal 128 (see, for example FIGS. 4 and 5) into the trap 10. The remaining portions of the enclosure 12 cover the trap mechanism and "kill area" and form a substantially complete enclosure therefore except for openings therein that cooperatively function with the trap mechanisms, openings that contribute to the functionality of the trap (see, for example FIGS. 3 and 4) or incidental openings that do not interfere with the function and benefits of the trap 10 of this invention.

The enclosure 12, as depicted in substantially all the Figures is overall of rectangular shape having a length substantially longer than its width. However, this invention contemplates various shapes that have substantially all of the elements, functionality and benefits described and claimed herein, e.g., a cylindrical or oval cross-section. The enclosure 12 can be made of metal, plastic, wood or a stiff cardboard depending on the intended life-span of the trap 10. It can be made transparent or with window portions to enable the user to view the mechanism and the any animal trapped therein or it can be made so that the mechanism and trapped animal are completely shielded from view.

Referring to FIGS. 1, 2, 4 and 5, optionally the trap 10 includes a handle 56 attached the front end of the enclosure 12 for easy transport, setting and activating. In the Figures the handle 56 is depicted as a horizontal cylinder mounted to the top of the enclosure 12, however any type handle may be used mounted at any convenient location on the enclosure 12.

Figure 4:
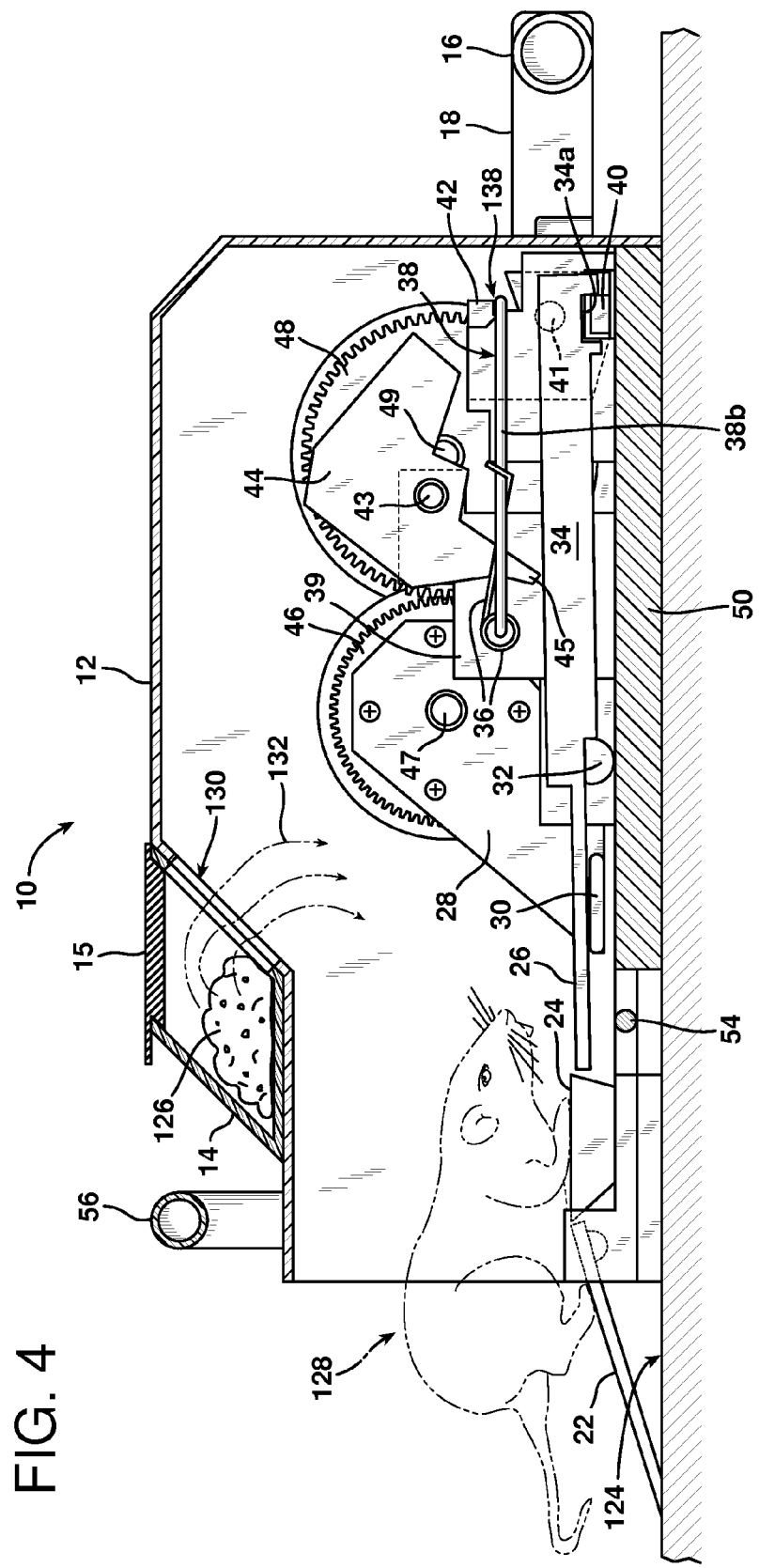
FIG. 4 is a cut-away side view taken along line 4-4 of FIG. 1 of the activated animal trap showing an animal therein just prior to being trapped.
Figure 5:
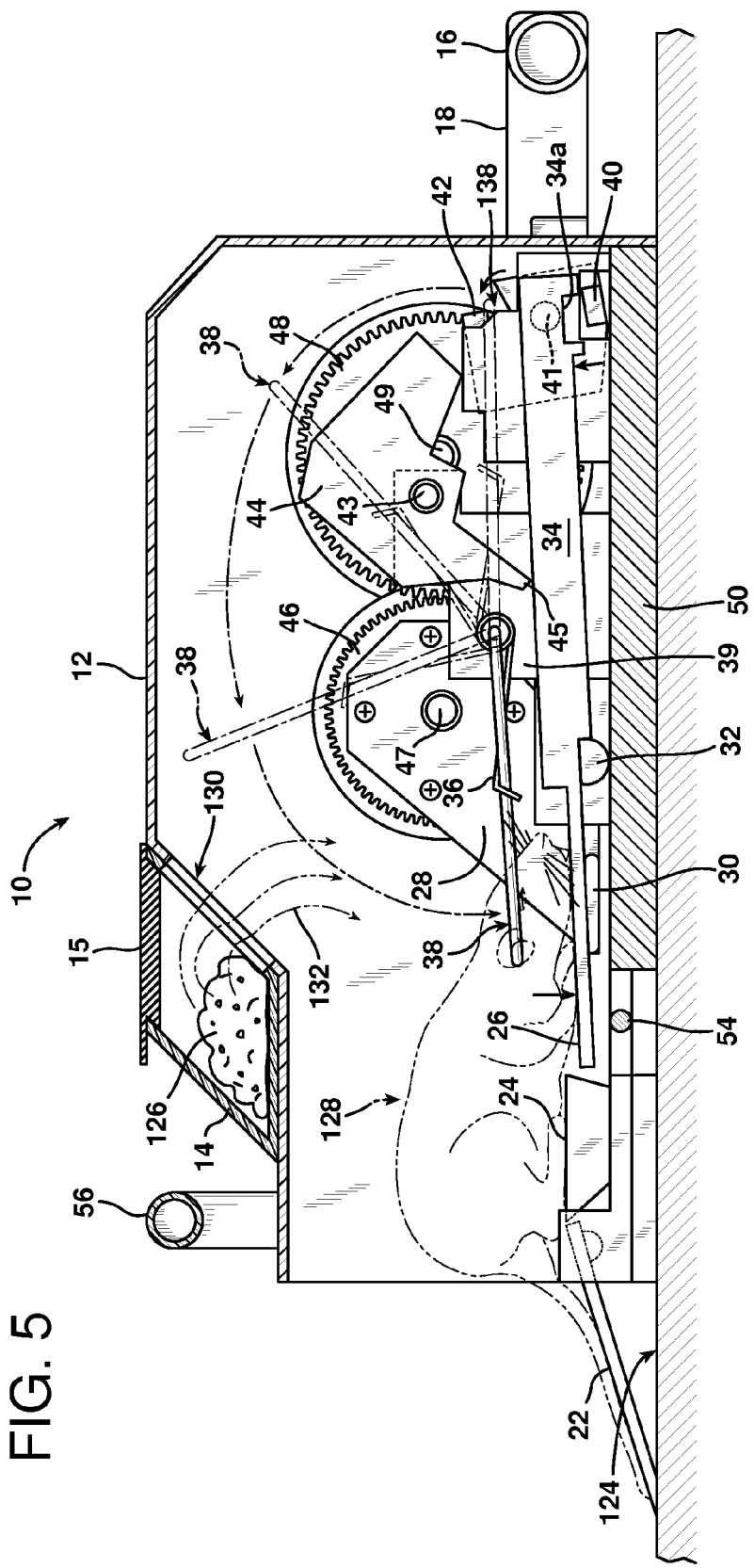
FIG. 5 is a cut-away side view taken along line 4-4 of FIG. 1 showing an animal therein just after being trapped.

Referring, for example, to FIGS. 1, 4 and 5, mounted to the outside top of enclosure 12 is a bait container 14 that is designed to hold various type baits therein 126 and has one or a plurality of venting ports 130 into the interior chamber of the enclosure into which the animal 128 is to be lured by the aroma or bait fumes 132 emanating therefrom. Thus the interior of container 14 and the interior of the enclosure 12 are in air communication with each other through vent ports 130. The bait container 14 preferably has a removable bait container cap 15 which can be removed (not shown) to place bait 126 in the container 14. The bait can be any type bait 126 to attract the desired animal. The bait container 14 allows a spreadable bait 126, for example, peanut butter, to be used. A bait 126 can be used that is partially wrapped to eliminate spreading it directly on any part of the bait container 14 in order to minimize the necessity for cleaning the container 14. The vents 130 allow the transfer of the bait odor or fumes 132 to the interior of the enclosure 12 to assist in luring the animal 128 into the trap 10. Having the bait station 14 on the top of the trap 10 outside of the enclosure 12 allows re-baiting the trap 10 without touching the trap area, allows for easy cleanup for reuse or storage of the trap 10 and prevents the animal from reaching the bait 126 so that the bait 126 may be reused.

Referring, for example to FIGS. 1, 3-5, 11-14 and 17, the front of enclosure 12 is provided with an entrance ramp 22 that leads through the opening 20 to the interior of the enclosure 12. The ramp 22 has a pivot means 23 attached to the bottom of the opening 20 for permitting the ramp 22 to pivot between the open position (for example, FIGS. 4 and 14) to permit the entrance of an animal 128 into the interior of the trap 10 and the closed position (FIG. 13) to close the opening 20 to the enclosure 12, for example, to transport or position the trap 10. The ramp 22 can have a textured material on portions thereof to permit the animal to obtain traction on the surface in all types of conditions, e.g., wet rain, snow, etc. (not shown) or inclinations. As shown for example in FIG. 4 the pivoting ramp 22 permits the animal 128 easy access to the interior because it rests on the ground surface 124 and the animal merely needs to walk up the ramp into the trap 10.

Referring to the Figures, the enclosure 12 and internal trap mechanism are securely mounted to a base 50. Referring to FIGS. 13, 14, 17A, and 17B, attached to the base 50 a distance from the opening 20 is a sliding L-shaped bracket 52. This bracket 52 spans or traverses the width of the base 50 (see, FIG. 3) and the foot of the L-shape extends to a location proximate the opening 20 of the enclosure 12. Posts 54 extend from the base 50 at opposite sides thereof upon which the bracket 52 is slidably mounted thereon by mating bracket slots 52A. Thus the bracket 52 may be slidably extended from the base (FIG. 14, 17A, 17B) for cantilevered mounting to, for example, a container 120 (trash can) or slidably retracted flush with the base (FIG. 13) for resting on a flat surface 124, e.g., ground. The bracket 52 may also be used to mount the trap 10, for example, to a raised tree root, a ledge, etc. to inhibit motion of the trap. Optionally, the bracket may having a locking means for locking the bracket in a predetermined position (not shown).

Referring to the Figures, for example to FIGS. 2,3,8, and 9 the trap 10 further includes an elongated crank 18 having at one end a hand grip 16 mounted substantially perpendicular to the crank 18. Broadly, the crank 18 is slidably mounted to the hub 118 of drive gear 48. Drive gear 48 is used to rotate and set the jaw frame or striker 38 to set the trap 10 and to release any animal 128 caught under the striker 38 (see FIGS. 17A and 17B) (discussed below). Crank 18 when not in use is slid into the inactive position depicted, for example, in FIGS. 2 and 6 and supported and hidden by slide carrier 72 affixed to the side of the enclosure 12. When it is desired to set the trap and/or release any animal caught under the striker 38, locking latch 60 is depressed (see FIGS. 2, 15 and 36A-36C) to enable the crank 18 to be pulled outward by hand grip 16 along the slide carrier 72 until fully extended 72 (see FIG. 8). Upon release of the locking latch 60 the end of the crank 18 locks onto hub 118 of drive gear 48. As depicted in FIGS. 9-12, as the crank is rotated toward the front of the trap 10 the striker 38 is raised (FIG. 9) and when the crank 18 is substantially fully rotated 180° from its original position (FIG. 10) the striker 38 has been set and the animal is released into the trash container 120 (see also FIGS. 17A and 17B). The crank is then rotated back 180° to its original position, the locking latch 60 is depressed and then the crank 18 is pushed by handle 16 into slide carrier 72 awaiting the next capture (see FIG. 17B)

Figure 15:
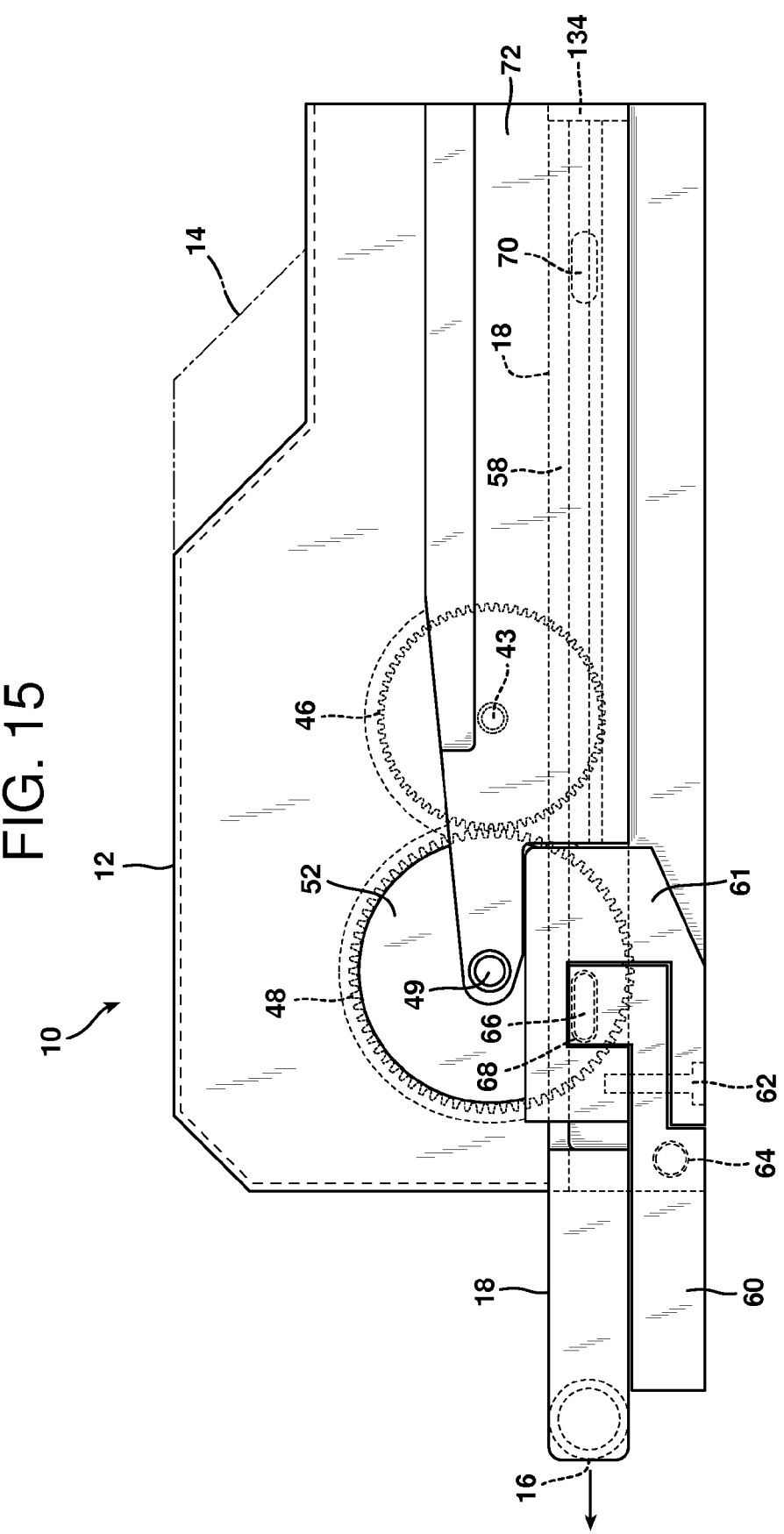
FIG. 15-16 are another side view of the animal trap of this invention showing the activation of the trap for catching an animal.
Figure 16:
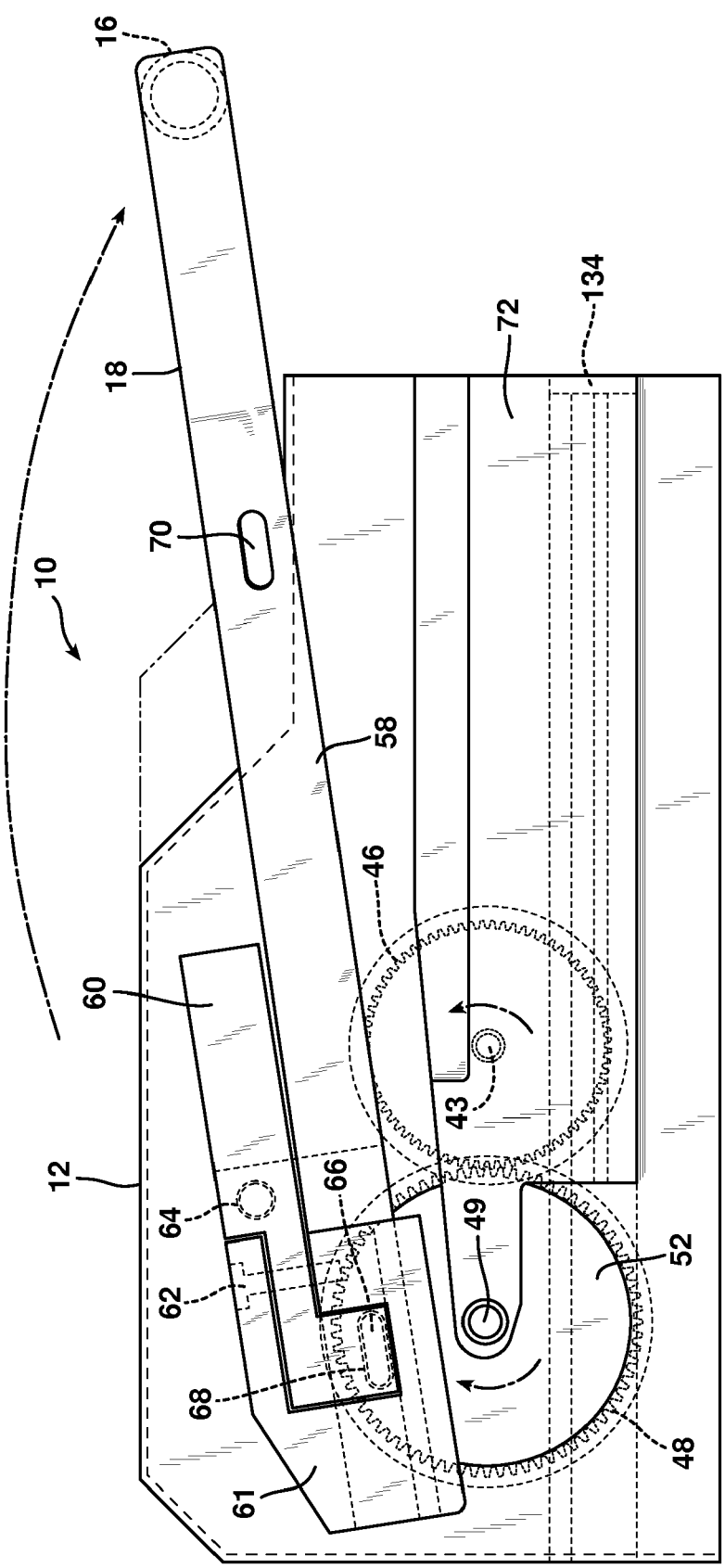

More specifically, the structure of the crank 18 is shown in detail in FIGS. 18A-18E. The crank 18 has a handle or hand grip 16 mounted at one end and perpendicular to the crank 18. Along the side of the crank 18 that is adjacent the enclosure 12 is a T-shaped flange 58 and a rear locking slot 68 and a front locking slot 70. Referring to FIG. 2,7,15,16 when the crank 16 is in the inactive position, as depicted in FIG. 15, the crank is within the slide carrier 72 with flange 58 resting upon and guided by channel 134 (see FIGS. 1, 7, 8,16). The crank 16 is locked in position by spring latch 60.

Referring to FIGS. 36A-36C and FIG. 7, the spring latch 60 includes a latch return spring 64 for maintaining the latch 60 in the locked position with the raised boss 66 slidably interlocking with the rear or front locking slots 68, 70, respectively, for locking the crank 16 in the desired inactive or active positions. The spring latch 60 is mounted to the drive gear 48 by carrier 61 which is attached drive gear hub 118. As depicted, for example, in FIG. 15, the raised boss 66 is slidably mates into rear locking slot 68 to maintain the crank in the locked, inactive position. In order to release the crank 18, the latch is depressed (FIG. 36B) causing rotation of the latch 60 on hinge rod 62 causing the boss 66 to be retracted. Upon release of latch 60 the boss 66 is moved into the locked position with the rear or front locking slots 68, 70.

Figure 8:
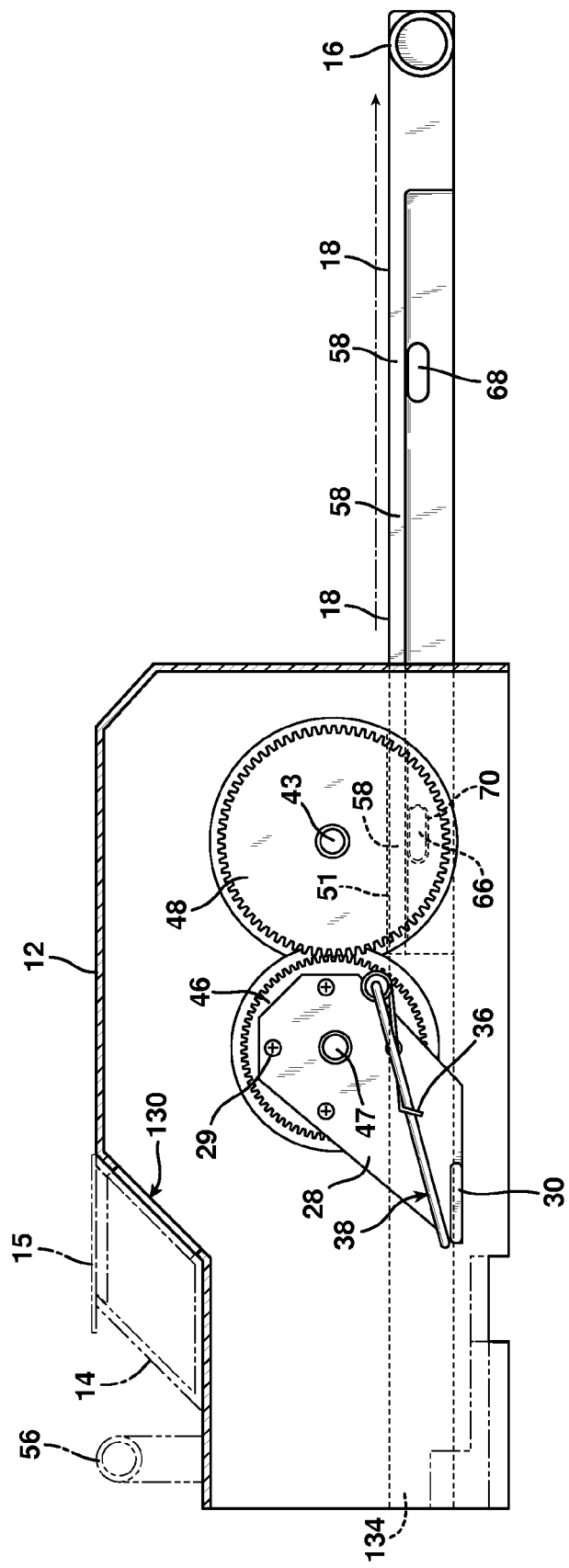
FIGS. 8-12 are cut-away side views taken along line 4-4 of FIG. 1 showing the activation of the trap for catching an animal.

If it is desired to set the trap 10 and/or release a trapped animal 128, the spring biased latch 60 is depressed releasing the boss 66 from the rear locking slot 68, to enable the crank 18 to be pulled outward by hand grip 16 along the slide carrier 72 and slot 51 in drive gear 48 until fully extended 72 (see FIG. 8). Upon release of the locking latch 60 the boss 66 slidably mates with the front locking slot 70 to lock the end of the crank 18 onto hub 118 of drive gear 48. As depicted in FIGS. 9-12, as the crank is rotated toward the front of the trap 10 the striker 38 is raised (FIG. 9) and when the crank 18 is substantially fully rotated 180° from its original position (FIG. 10) the striker 38 has been set and the animal is released into the trash container 120 (see also FIGS. 17A and 17B). The crank is then rotated back 180° to its original position, the locking latch 60 is depressed and then the crank 18 is pushed by handle 16 into slide carrier 72 and the boss 66 springedly interlocks with to rear locking slot 68 to lock the crank 18 in the inactive position.

Figure 9:
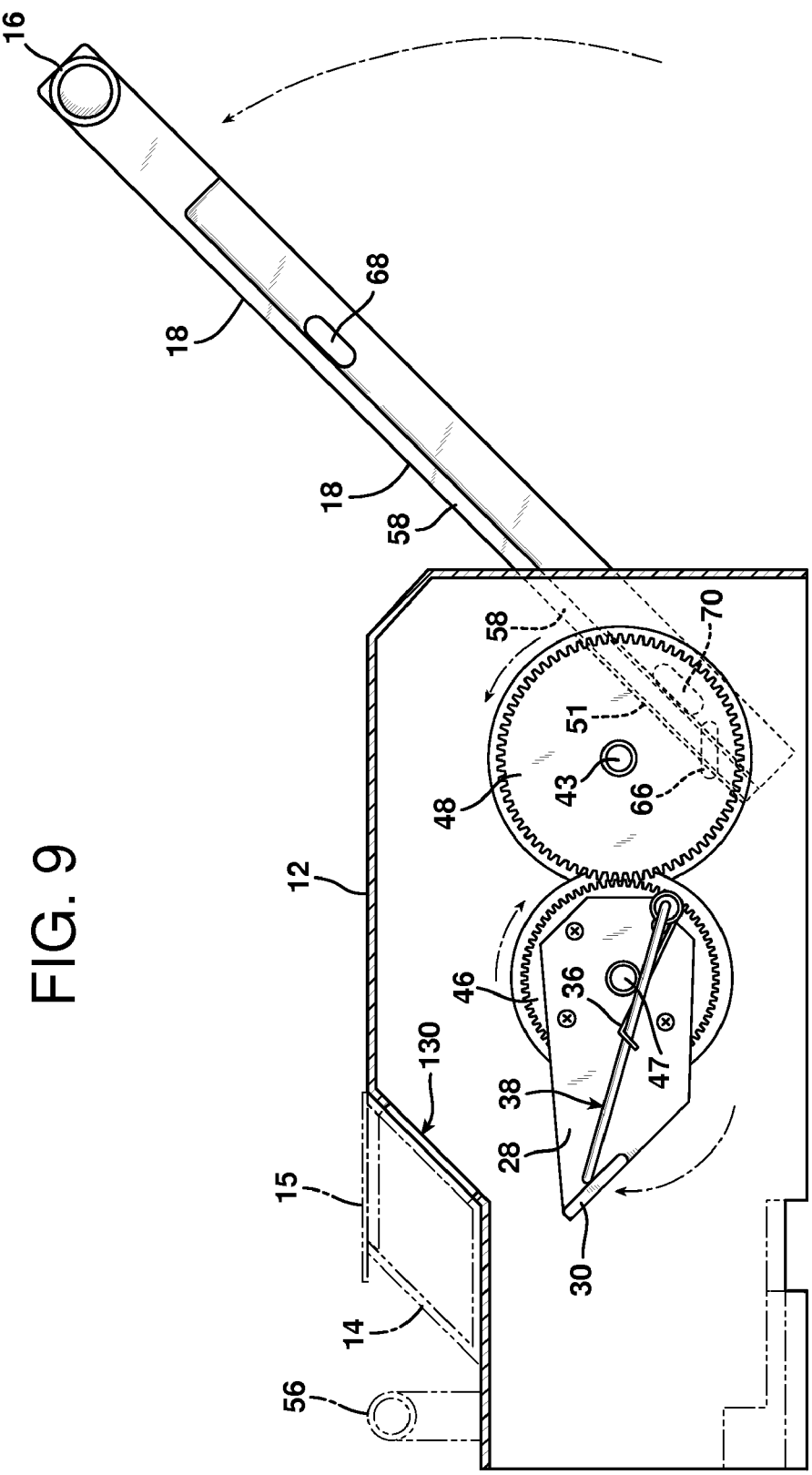
Figure 10:
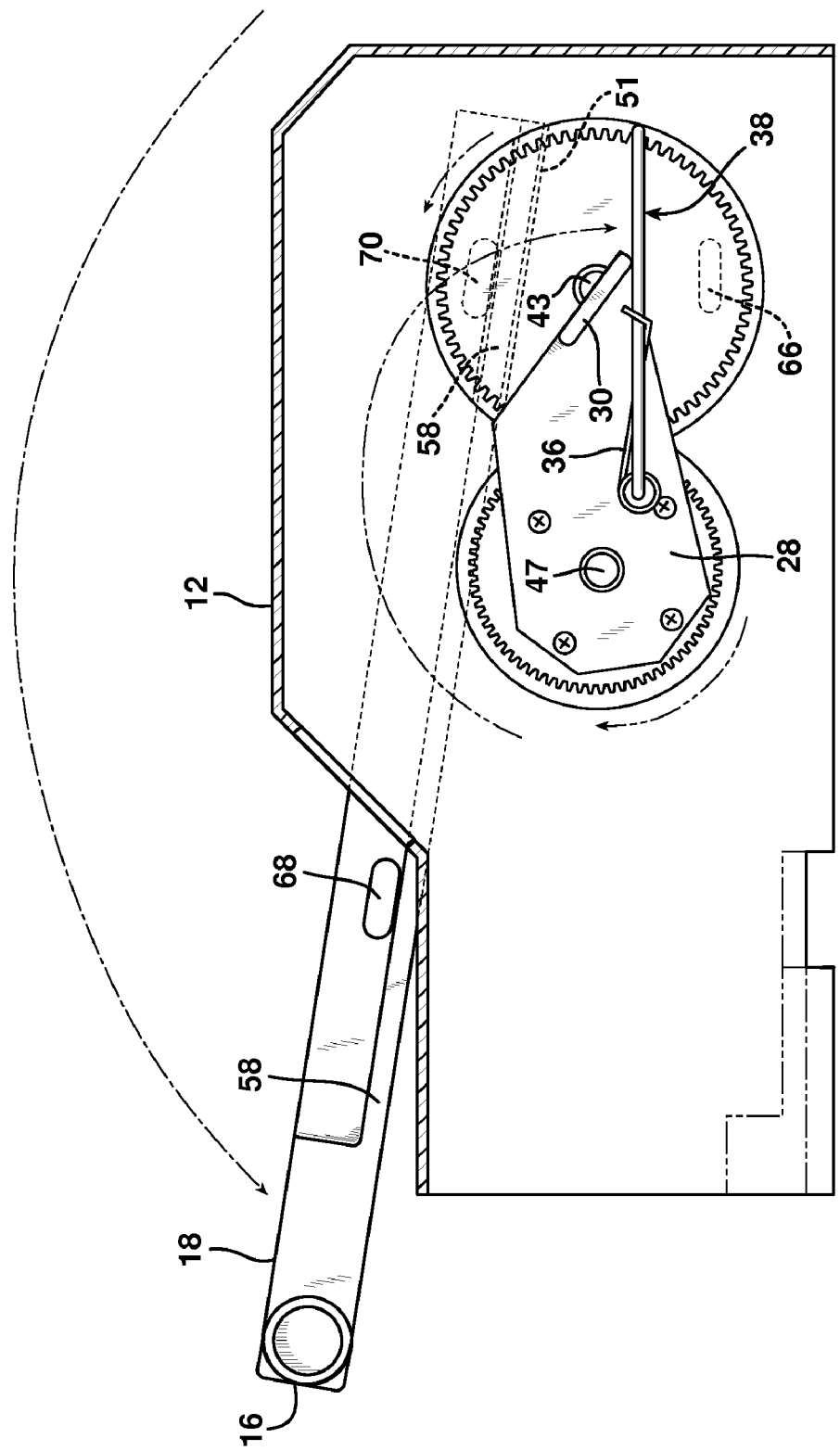
Figure 11:
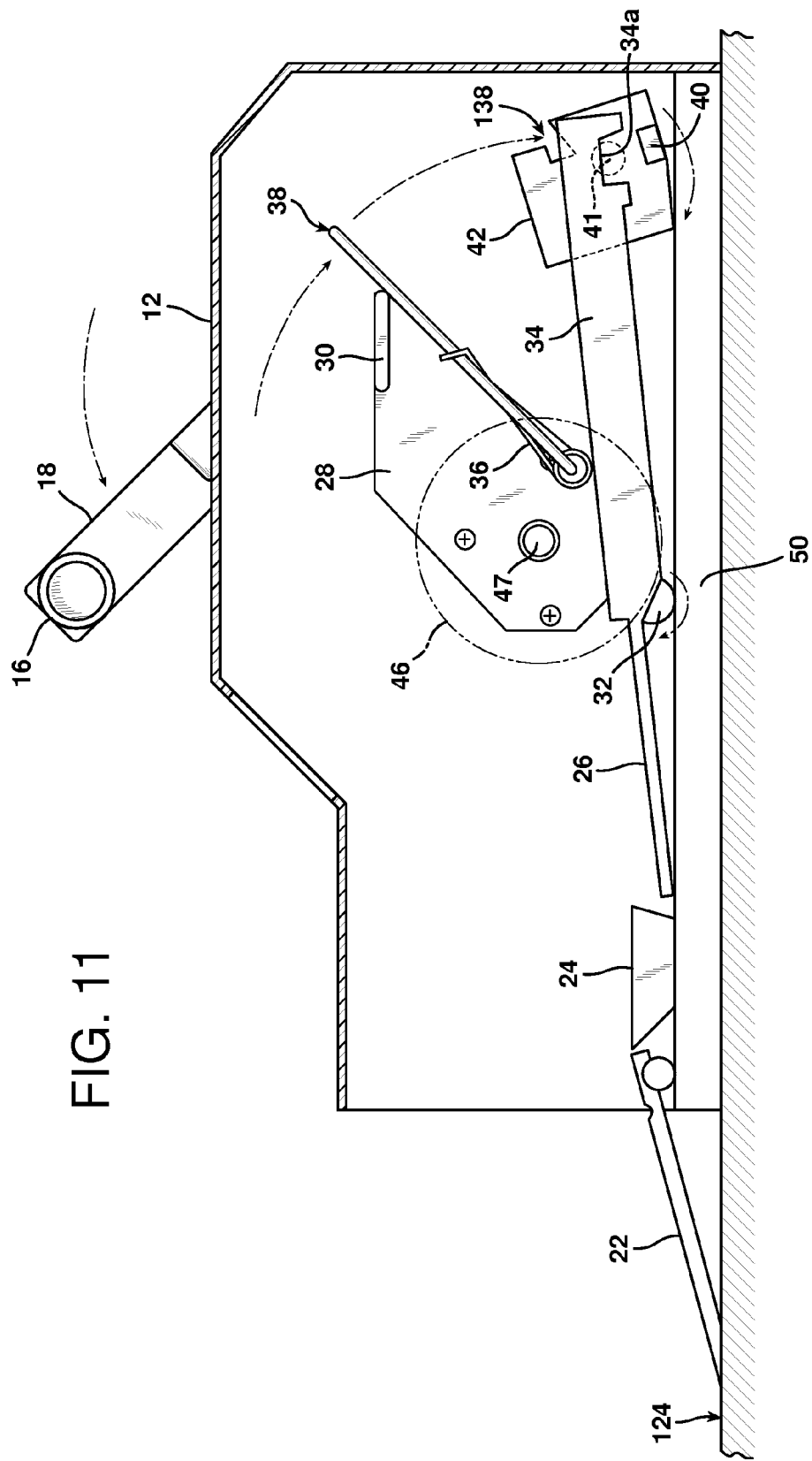
Figure 12:
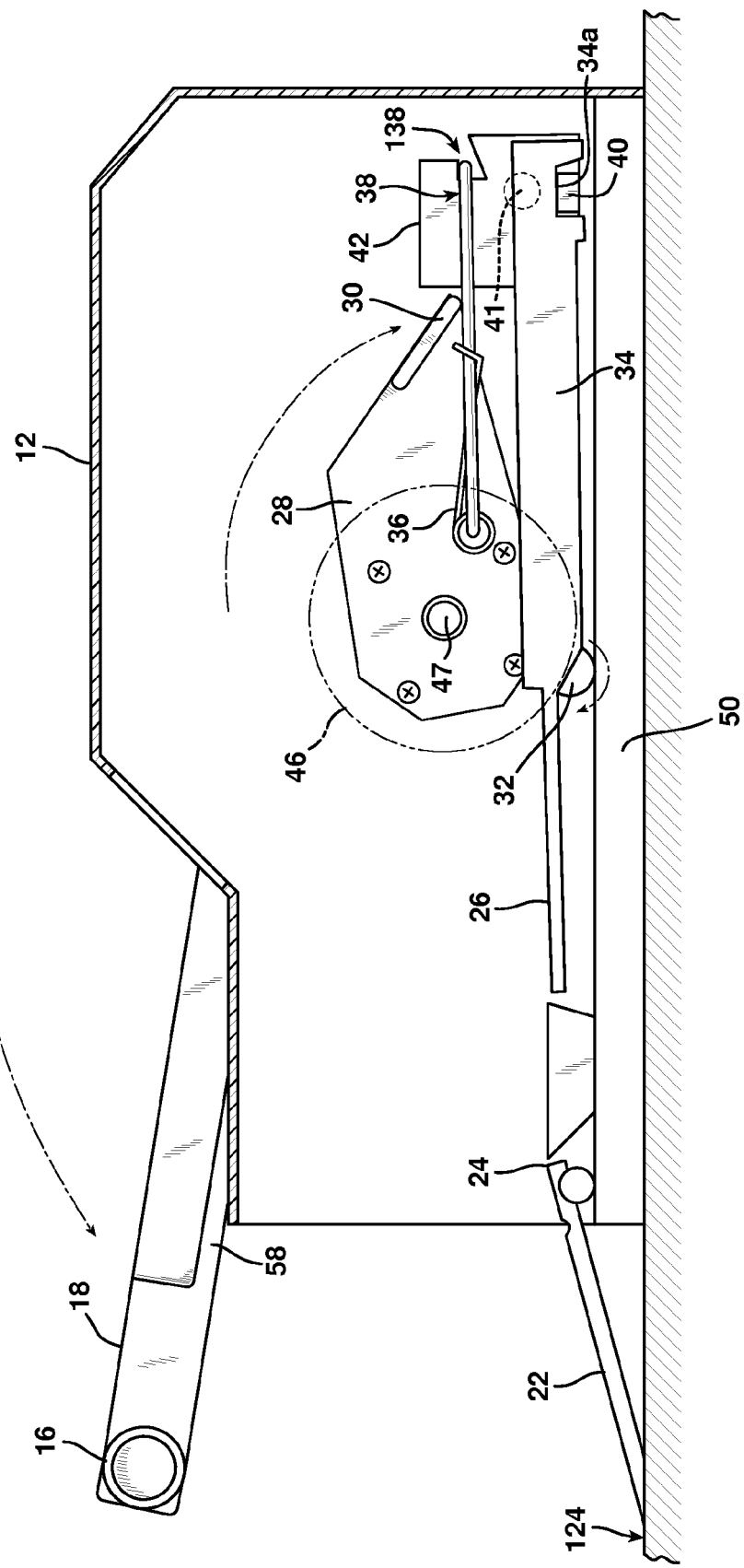
Figure 13:
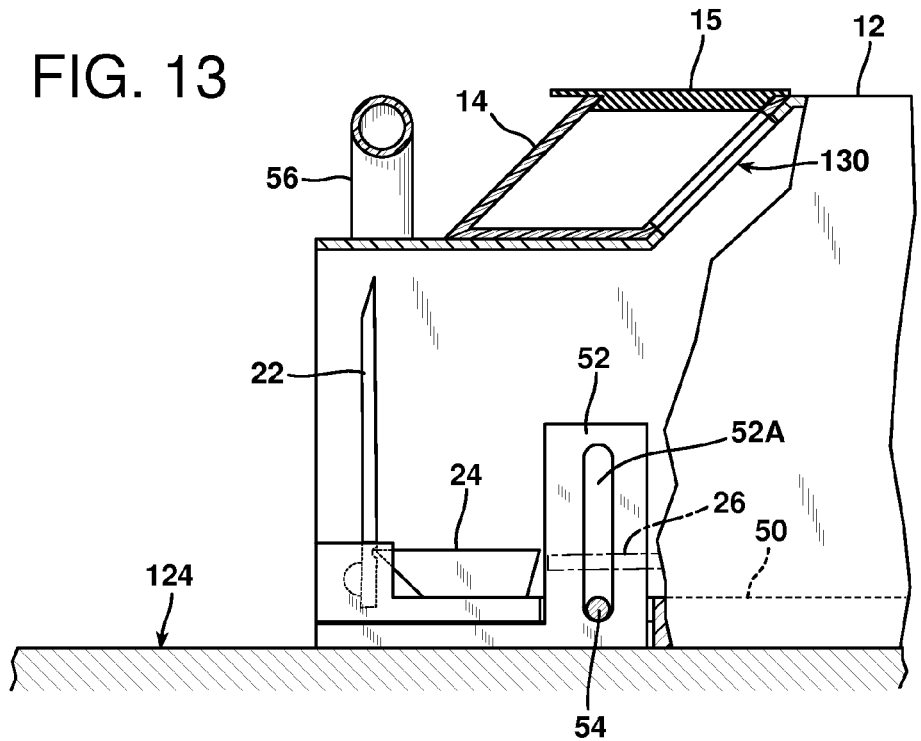
FIGS. 13-14 are cut-away side views of the entrance to the trap showing the functioning of the entrance ramp 22, attachment bracket 52 and the bait container 14.
Figure 14:
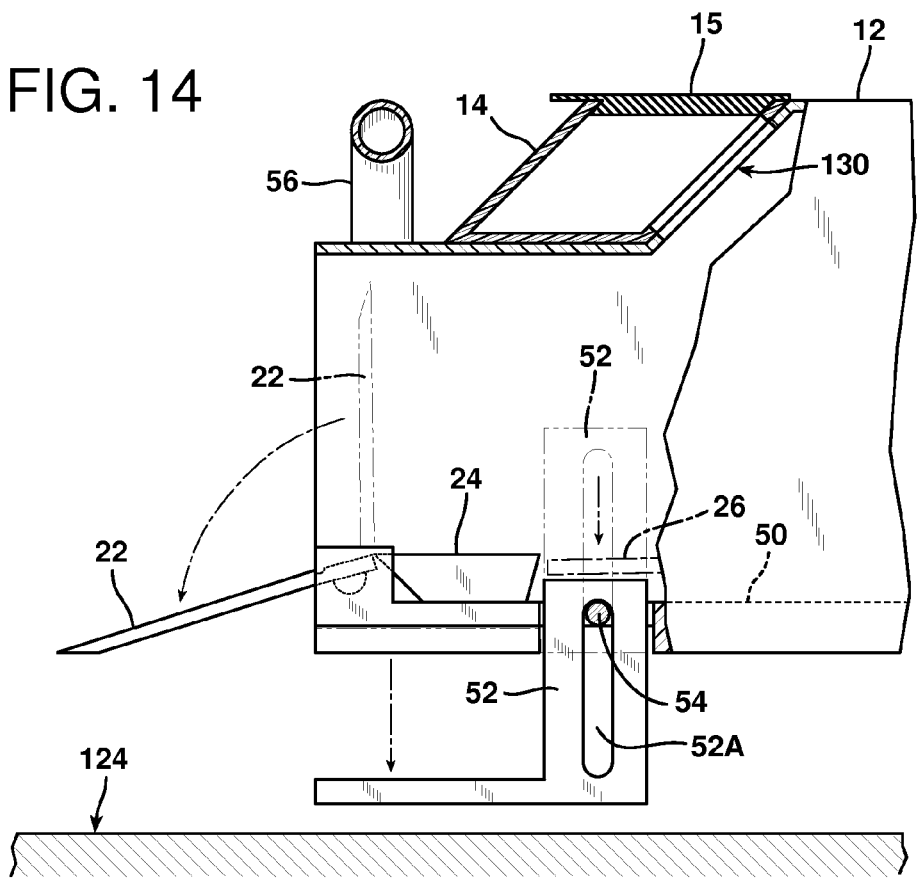

The drive gear 48 and drive gear hub 118 rotate about and are mounted on drive gear shaft 49 which is mounted to and passes through the enclosure 12. The enclosure 12 encloses the trap mechanism, including the drive gear 48 and drive gear hub 118. Referring for example to FIGS. 8-10, the crank 18, which is locked onto the drive gear hub 118 by boss 66 matingly engaged with front locking slot 70, is rotated thus rotating drive gear 48. Drive gear 48 is meshed with driven gear 46. Referring to FIG. 9, as crank 18 rotates in a counter-clockwise direction, drive gear 48 is also rotated in such direction while driven gear 46 rotates on shaft 47, which is mounted to the enclosure 12, in a clockwise direction to raise the striker 38 for setting the trap and/or releasing the animal 128. The length of the crank 18, combined with the ratio of the diameters of the gears 46, 48 are substantial factors in determining the ease with which the trap 10 can be set. For example, the longer the crank 18 the less force is needed to set the trap 10. Likewise, the greater the diameter of the gears 46, 48, the less force that is needed. Although the embodiment depicted shows drive and driven gears 46, 48 that mesh, alternatively the drive and driven gears may be rollers that are frictionally engaged.

Referring for example to FIGS. 6-12, mounted to the driven gear 46 is cocking bracket 28 that rotates in unison with driven gear 46 about shaft 47. In the Figures presented cocking bracket 28 is mounted to the driven gear with a plurality of bolts or screws 29. It should be understood that any means may be used to provide such mounting means, including having the driven gear 46 and cocking bracket 28 being of a unitary molded or shaped structure. The cocking bracket 28 extends from the driven gear 46 forward toward the open end 20 when idle. At the distal end of the bracket 28 is a flange 30 that slightly protrudes into the enclosure 12 perpendicular to the surface of the bracket 28. When the trap 10 is not set or is inactive one arm 38*a* of the U-shaped striker 38 rests on the protruding bracket (see FIG. 3). When the crank 18 is rotated towards the opening 20, as shown for example in FIG. 9, the drive gear 48 is rotated counterclockwise and the driven gear 46 is rotated clockwise causing the bracket 28 to rotate therewith and causing the striker 38 that is engaged with the flange 30 to also rotate and raise the striker from the "kill zone" of the trap 10.

Figure 3A:
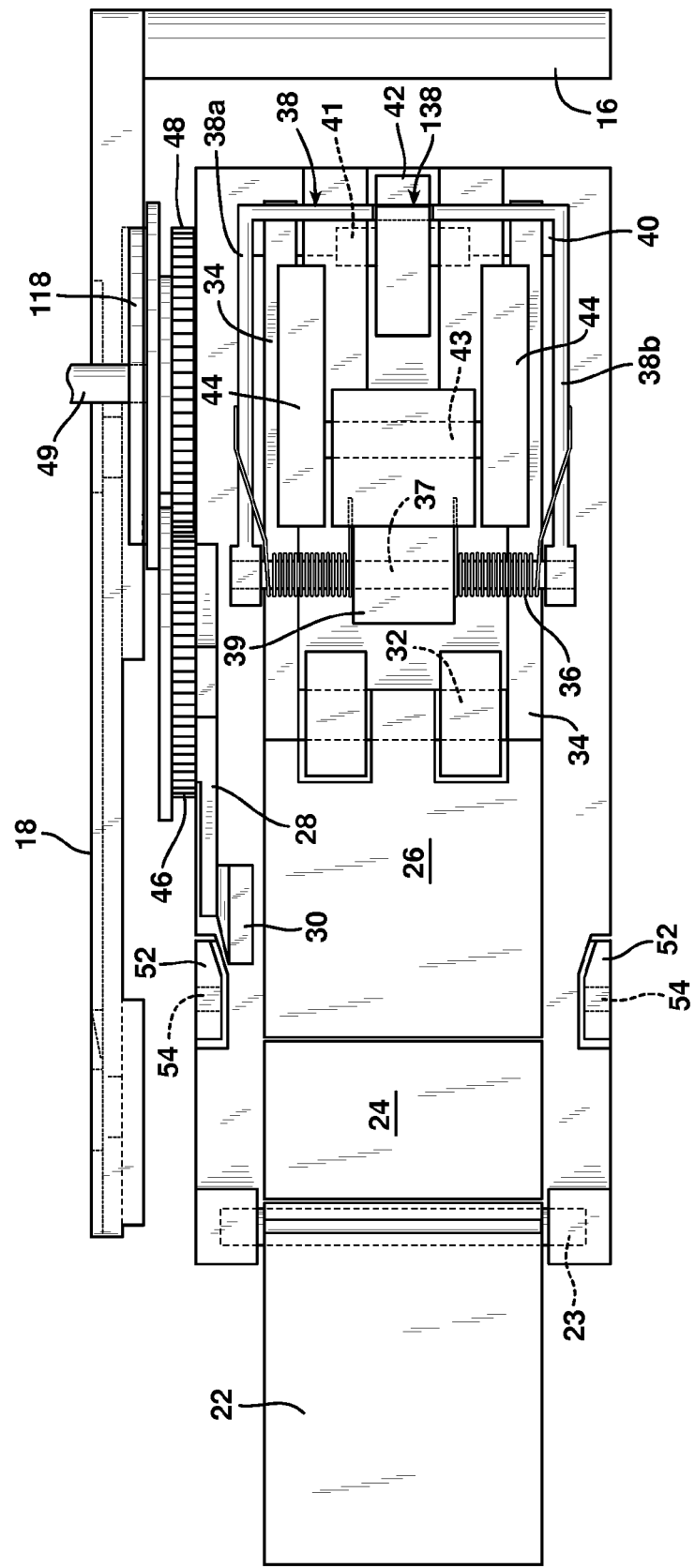
FIG. 3A is a cut-a-way top plan view of the animal trap with the enclosure removed after activation and enabled for catching an animal.

Referring for example to FIGS. 3-5, the striker 38 is a U-shaped rod or structure that includes arms 38*a* and 38*b* of sufficient rigidity and strength to kill the designated animal. For small animals, e.g., mice, the striker 38 can be a rigid metallic wire and for larger animals, e.g., rats, a more substantial structure. If the trap 10 is to be a reusable trap 10, as contemplated herein, the striker 38 should structurally be capable of multiple uses and be able to withstand washing without corrosion.

The striker 38 is mounted at the ends of the aims 38*a*, 38*b* to each end of striker shaft 37. Shaft 37 is rotatably mounted through mounting block 39 which is mounted to or affixed to base 50 (see FIGS. 4, 5). Referring for example to FIG. 3-5, mounted on striker shaft 37 is at least one striker spring 36 that is coupled to striker arms 38*a*, 38*b* for driving the striker 38 counterclockwise and downward onto actuating platform 26, i.e., the spring 36 biases the striker 38 towards the sprung position. In the embodiment depicted there are two striker springs 36 each one mounted on the striker shaft on each side of the mounting block 39 and coupled, respectively to striker arms 38*a*, 38*b*. The springs should be of sufficient strength and force to cause the striker 38 to kill the designated animal. Any type springs are contemplated, with spiral springs 36 being shown in the Figs.

Referring to FIGS. 3-5, 11-12, and 37A-37C as the crank 18 is rotated toward the substantially fully rotated position 180° from its original inactive position, the striker 38 is rotated toward the rear of the trap 10 and is inserted into the capture slot 138 of rotating catch 42 mounted substantially in the center of the base 50 proximate the rear of the base 50. As the striker 38 is inserted into capture slot 138 it rotates catch 42 about shaft 41 into a position wherein the locking bar 40 is rotated to a position (FIGS. 11-12) wherein counter weight beams 34 mounted on each side of the catch 42 drop causing the notch 34*a* in each beam to releasably lock with locking bar 40 extending from each side of catch 42 to thereby activate the trap 10. Counterweight beams 34 are attached to and extend from actuating platform 26 upon which the animal steps when it goes through the trap entrance 20. At the juncture of the platform 26 and the associated counterweight beams 34 is a nub 32 which functions as a pivot point about which the actuating platform 26 and counterweight beams 34 pivot. In particular, as the counterweight beams 34 drop from the inactive position (FIG. 11) to the activated position (FIG. 12) the platform 26 is raised and in ready position for the animal 128 to step thereon, see for example FIGS. 4 and 5. When the animal steps on the activating platform 26 the platform 26 drops causing the counterweight beams 34 to raise and disengage the notches 34*a* from locking bar 40 causing the rotating catch 42 to rotate releasing the striker 38 to catch and kill the animal 128.

As the animal enters the trap 10 by stepping onto entrance ramp 22 and passes through opening 20 it is preferred that there be a pedestal 24 attached to the base 50 that is at about the same level as the actuating platform 26. This permits the animal 128 to fully enter the trap 10 without activating the striker 38 ensuring that when the animal activates the striker 38 by stepping on platform 26 the striker 38 fully strikes the animal 128. Without such pedestal 24 the trap might be activated by, for example, the animals foot and the striker 38 may only strike the foot, thus only wounding the animal, which is inhumane, but more importantly such injured animal can be harmful to persons in that it might attack someone when released.

Figure 17A:
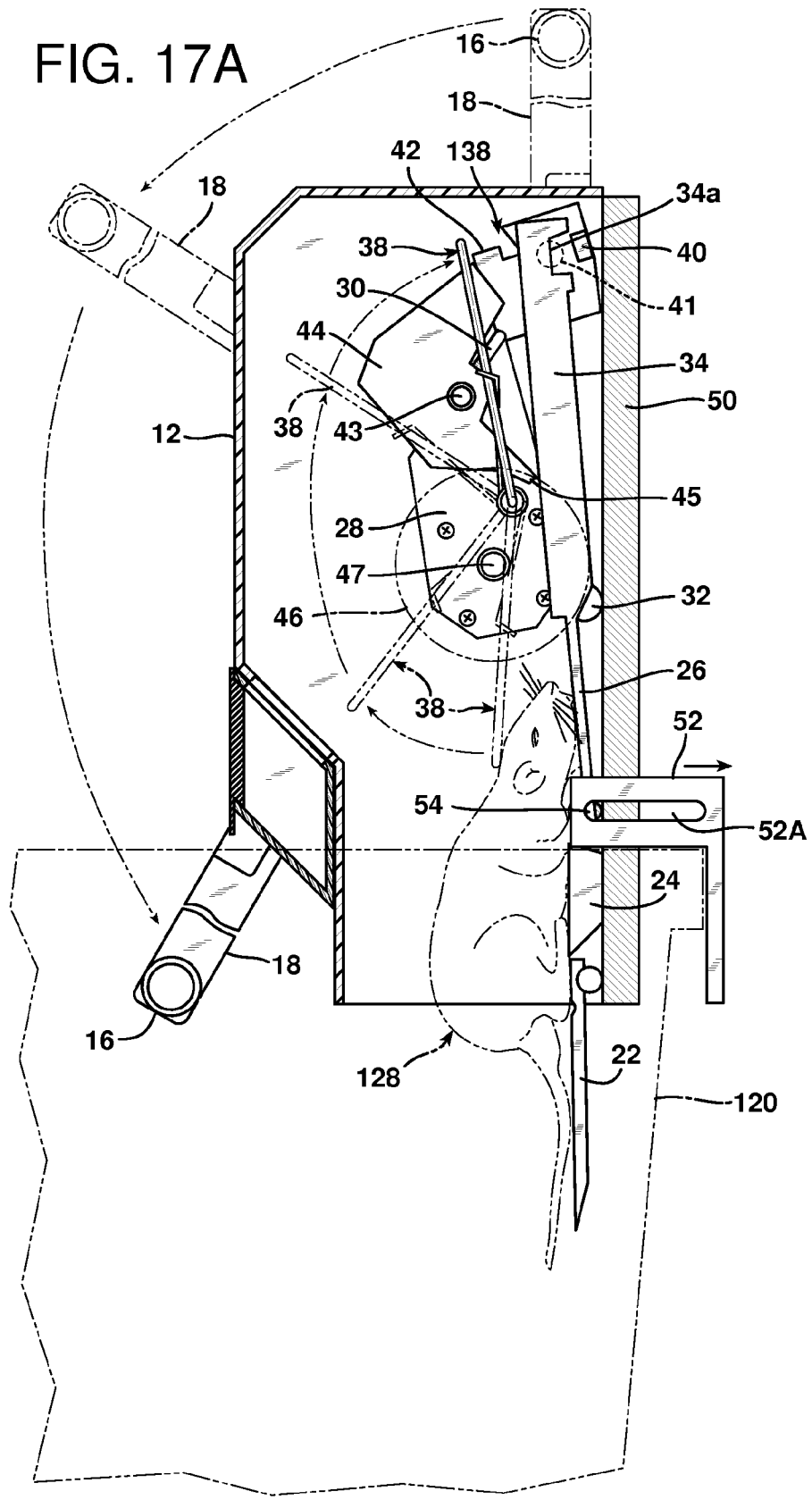
FIGS. 17A & 17B are cut-away side views taken along line 4-4 of FIG. 1 demonstrating the removal of a dead animal from the trap after being trapped and killed by the trap.
Figure 17B:
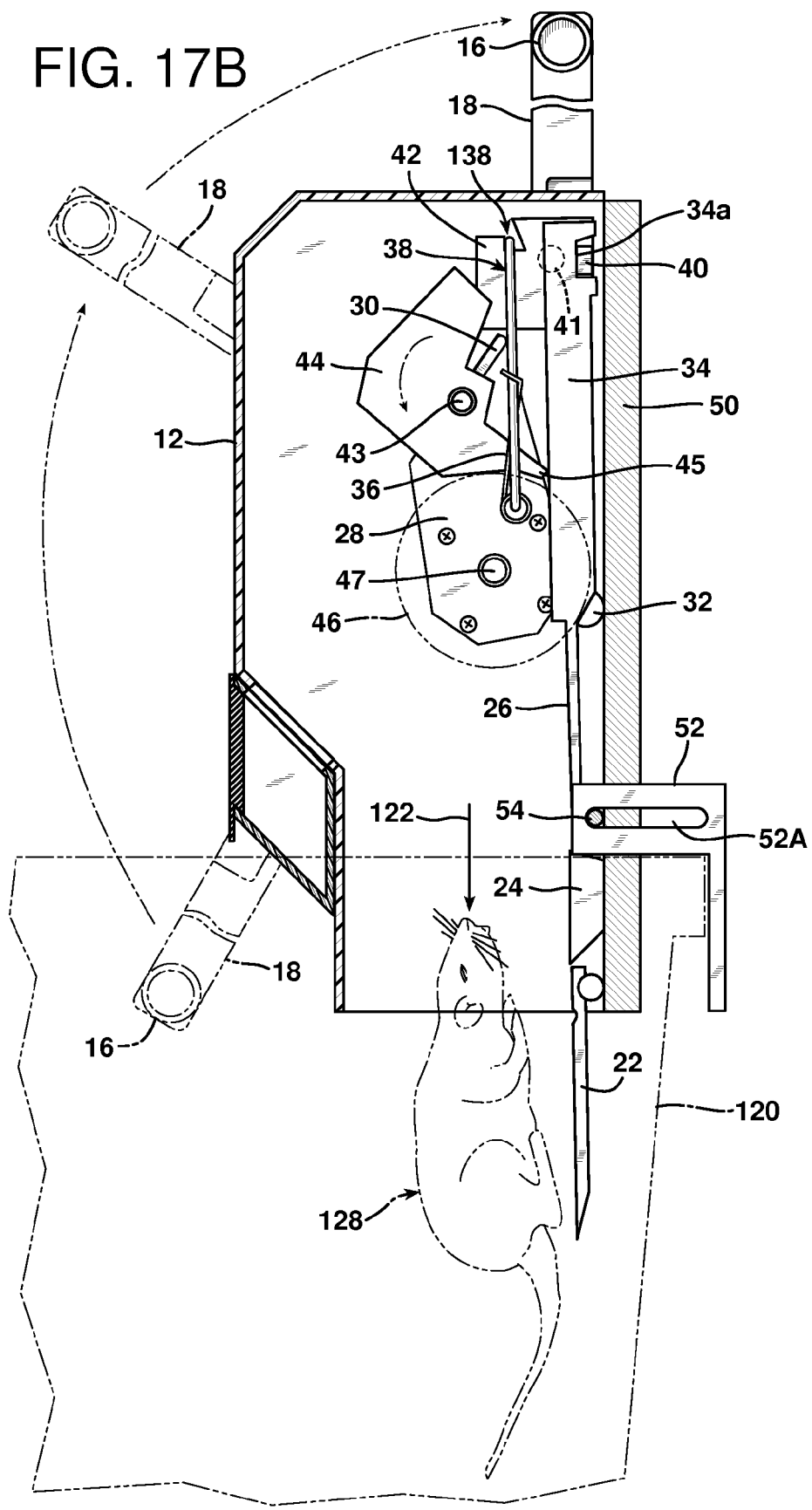
Figure 24:
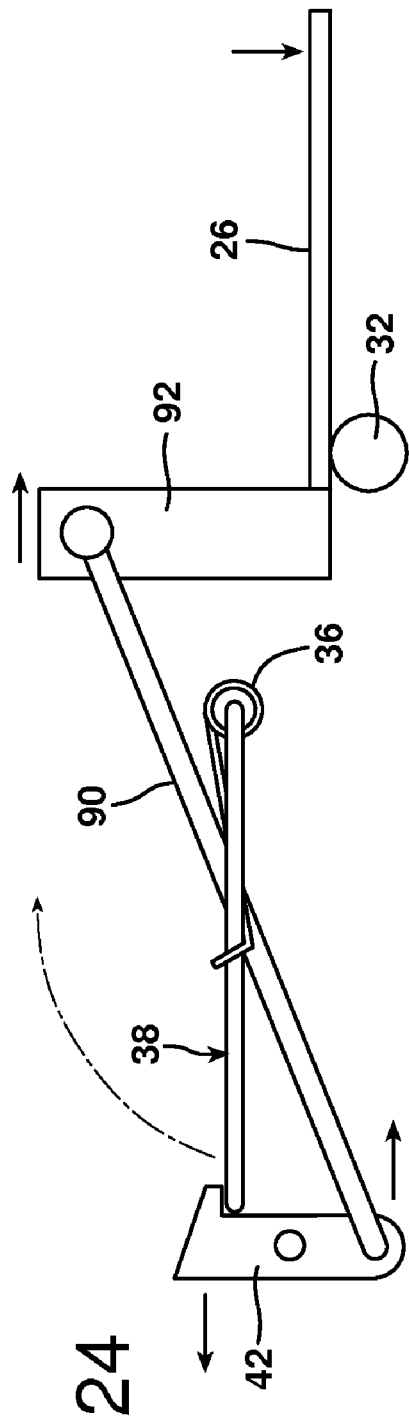
Figure 25:
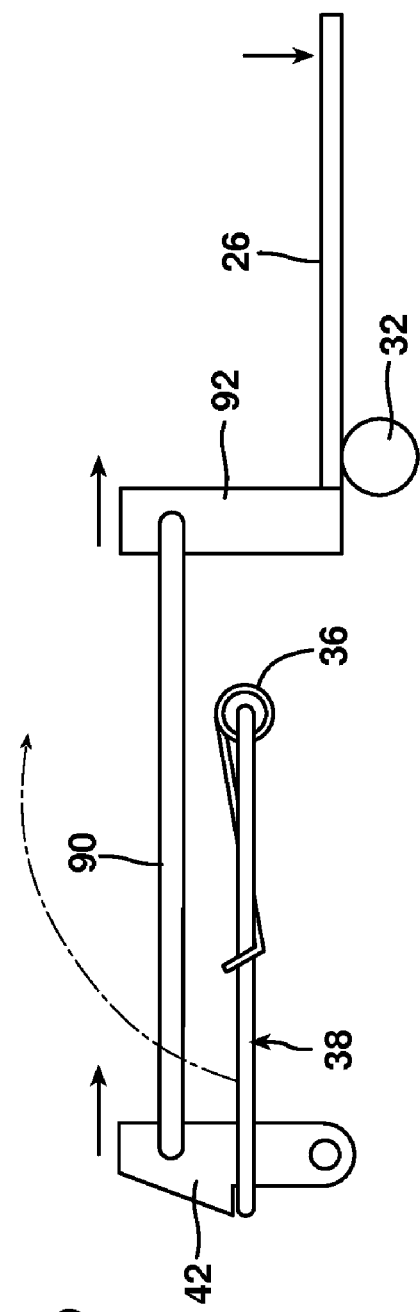
Figure 28:
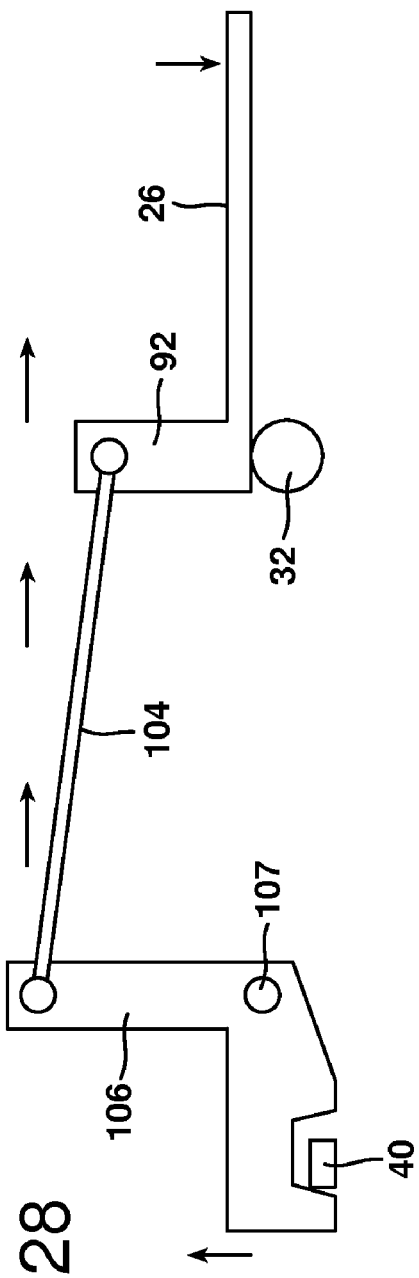
Figure 29:
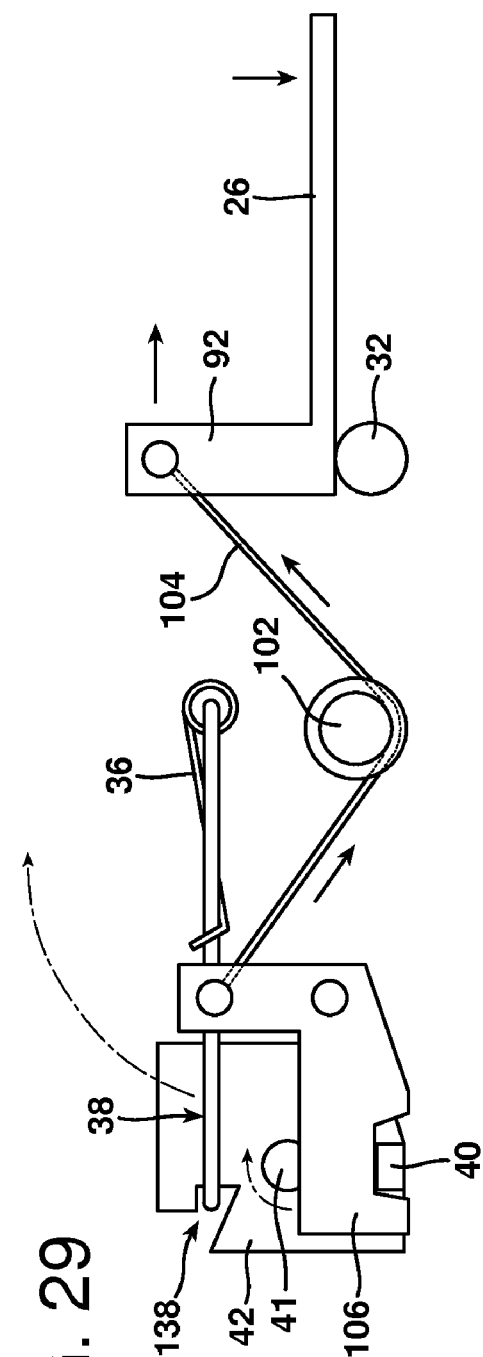
Figure 32:
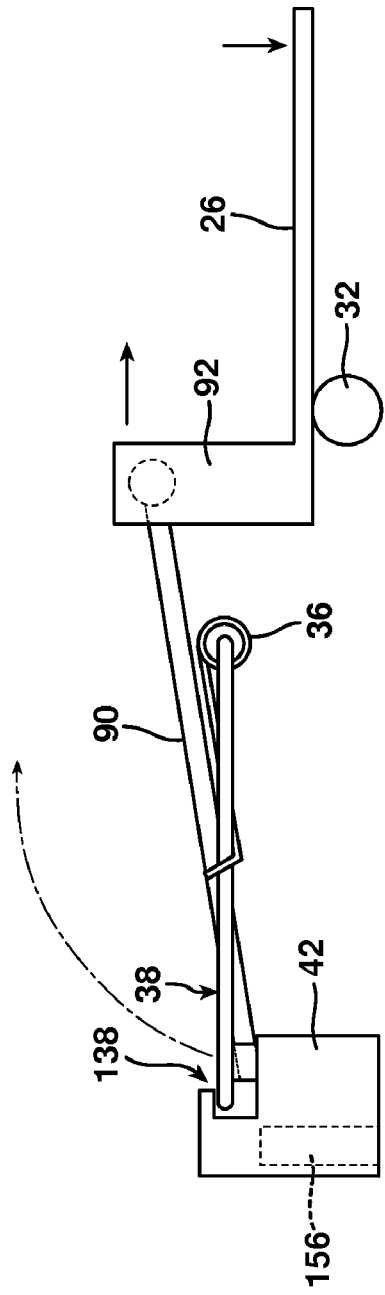
Figure 35:
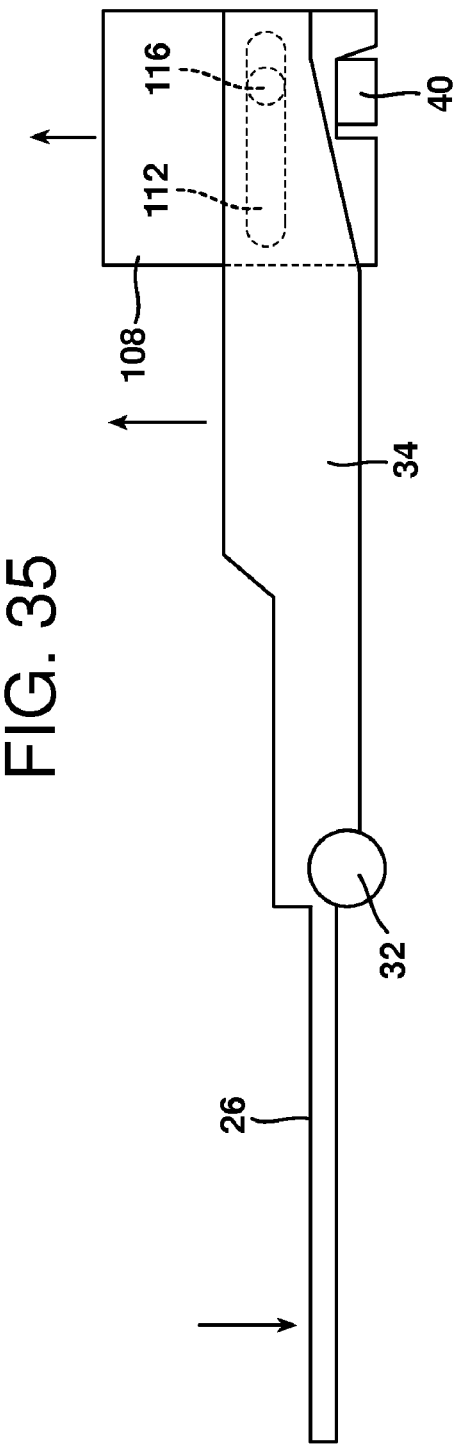
Figure 36A:
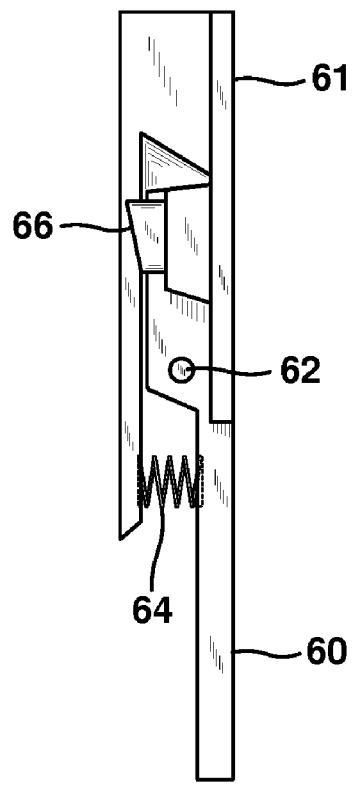
FIG. 36A-36C show a preferred embodiment of the latch mechanism used to position the crank used to arm the trap of this invention.
Figure 36B:
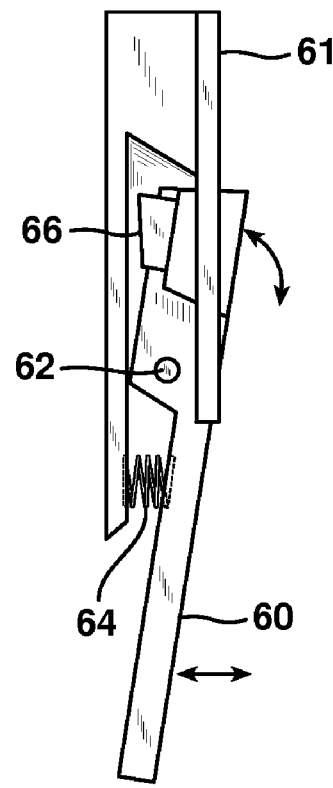
Figure 36C:
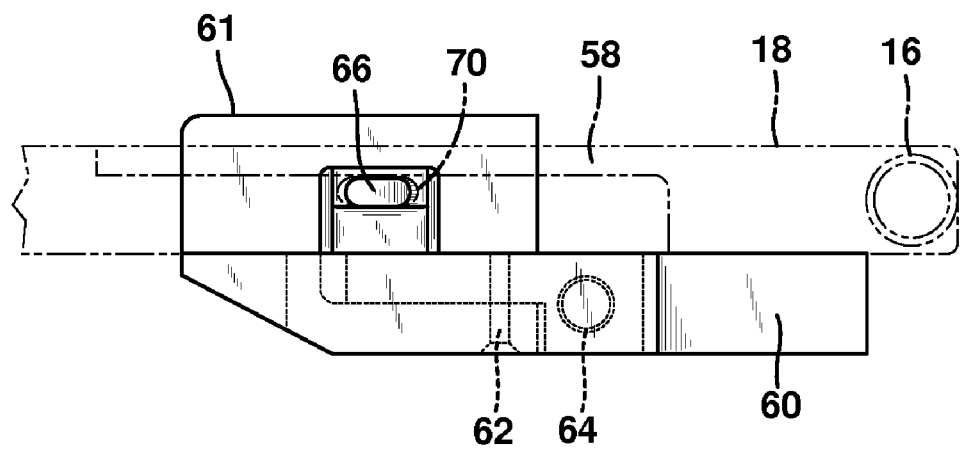
Figure 37A:
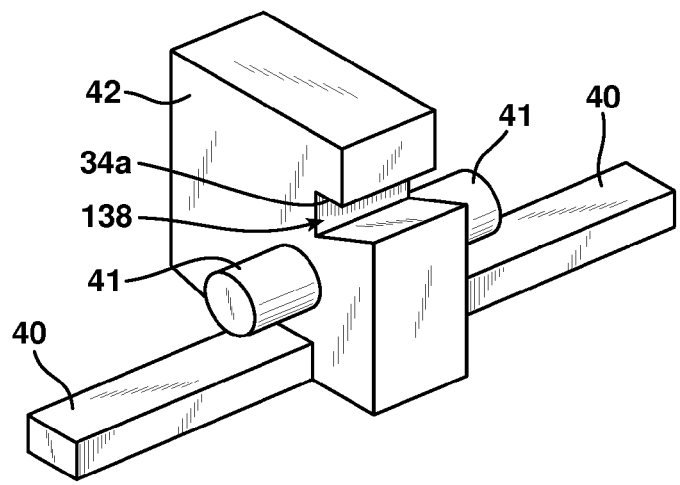
FIGS. 37A-37C show a preferred embodiment of the rotating latch and locking bar used to lock the striker in position used in the trap of this invention.
Figure 37B:
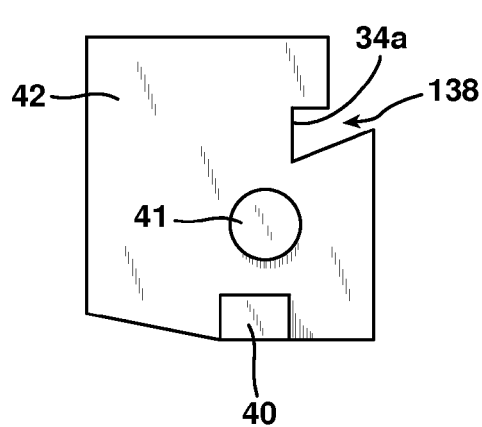
Figure 37C:
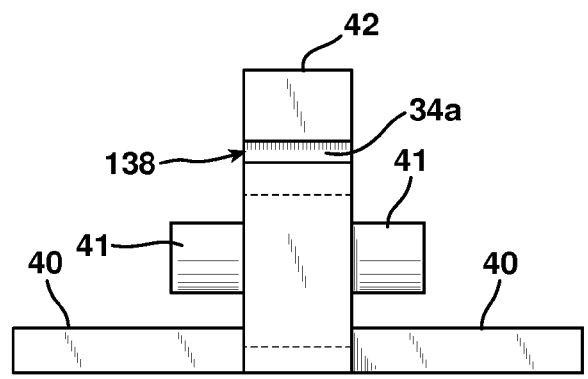

Referring to FIGS. 3, 17A and 17B, in the preferred embodiment of this invention additional counterweights 44 are mounted on shaft 43 above each counterweight beam 34. Each counterweight 44 has an extension 45. When the trap 10 is armed or active the extensions 45 are not in contact with the counterweight beams 34. When the animal 128 trips striker 38 by stepping on the platform 26 the platform 26 goes downward and the counterweight beams 34 go upward and are controlled or limited in their upward motion by the beam 34 coming in contact extension 45 thus controlling the mechanism to permit the flawless resetting of the trap 10.

FIGS. 19-21 show schematic views of differing embodiments for re-positioning the actuating platform 26 of the trap of this invention after the trap 10 has sprung.

In FIG. 19, as driven gear 46 is rotated counterclockwise by coaction with drive gear 48 (not shown) to arm the trap 10, mounted near the upper portion of driven gear 46 is a drive spring 146, mounted on one end in lug 144 and on the other end in angled lever arm 142. The drive spring 146 pushes the angled lever arm 142 about pivot shaft 147. The other end of angled lever arm 142 pushes against platform leg 140 pivoting the platform 26 and platform leg 140 about platform pivot shaft 32 to thereby raise the platform. When the animal (not shown) pushes the platform downward, the spring also 146 sets the resistance for actuating the striker.

In FIG. 20, as driven gear 46 is rotated counterclockwise by coaction with drive gear 48 (not shown) to arm the trap 10, mounted near the bottom portion of driven gear 46 is a drive spring 146, mounted on one end in lug 144 and on the other end in platform leg 140. The spring 146 pushes the platform 26 and platform leg 140 about platform pivot shaft 32 to raise the platform. This particular setup eliminates the complexity of using the angled lever arm that is used in the schematic shown in FIG. 19.

In FIG. 21 we see a schematic for re-positioning the actuating platform 26 of the trap of this invention after the trap 10 has sprung with the mechanism mounted to the drive gear 48. In this embodiment as drive gear 48 is rotated clockwise to arm the trap 10, mounted near the upper portion of drive gear 48 is lug 144 that pushes through push rod 145 a set of rotating levers 74 that push against one end of the drive spring 146 mounted near the bottom of the drive gear 48. The other end of the drive spring 146 is mounted in and pushes against platform leg 140 pivoting the platform 26 and platform leg 140 about platform pivot shaft 32 to thereby raise the platform 26.

FIGS. 22-35 are schematic views of various embodiments of the tripping mechanism used in the animal trap of this invention and elements therefore.

FIGS. 22 and 23 shows two embodiments using the frictional rotation of cooperatively engaged curved members to release the striker when the animal steps on the actuating platform. In each of these embodiments as platform 26 goes downward due to the weight of the animal (not shown), curved frictional member 78 attached to the rear portion of platform 26 pivots about pivot member 32 frictionally driving first driven roller 80. In FIG. 22, the first driven roller 80 frictionally engages and drives a second driven roller 82 which frictionally engages frictional surface 110 of sliding lock 148 raising the lock 148 to release the locking bar 40 to cause the release of the striker to catch and kill the animal. In FIG. 23, the first driven roller 80 frictionally engages and drives a second driven curved driven member 86 which raises the rotating lock 84 to release the locking bar 40 to cause the release of the striker.

Figure 47:
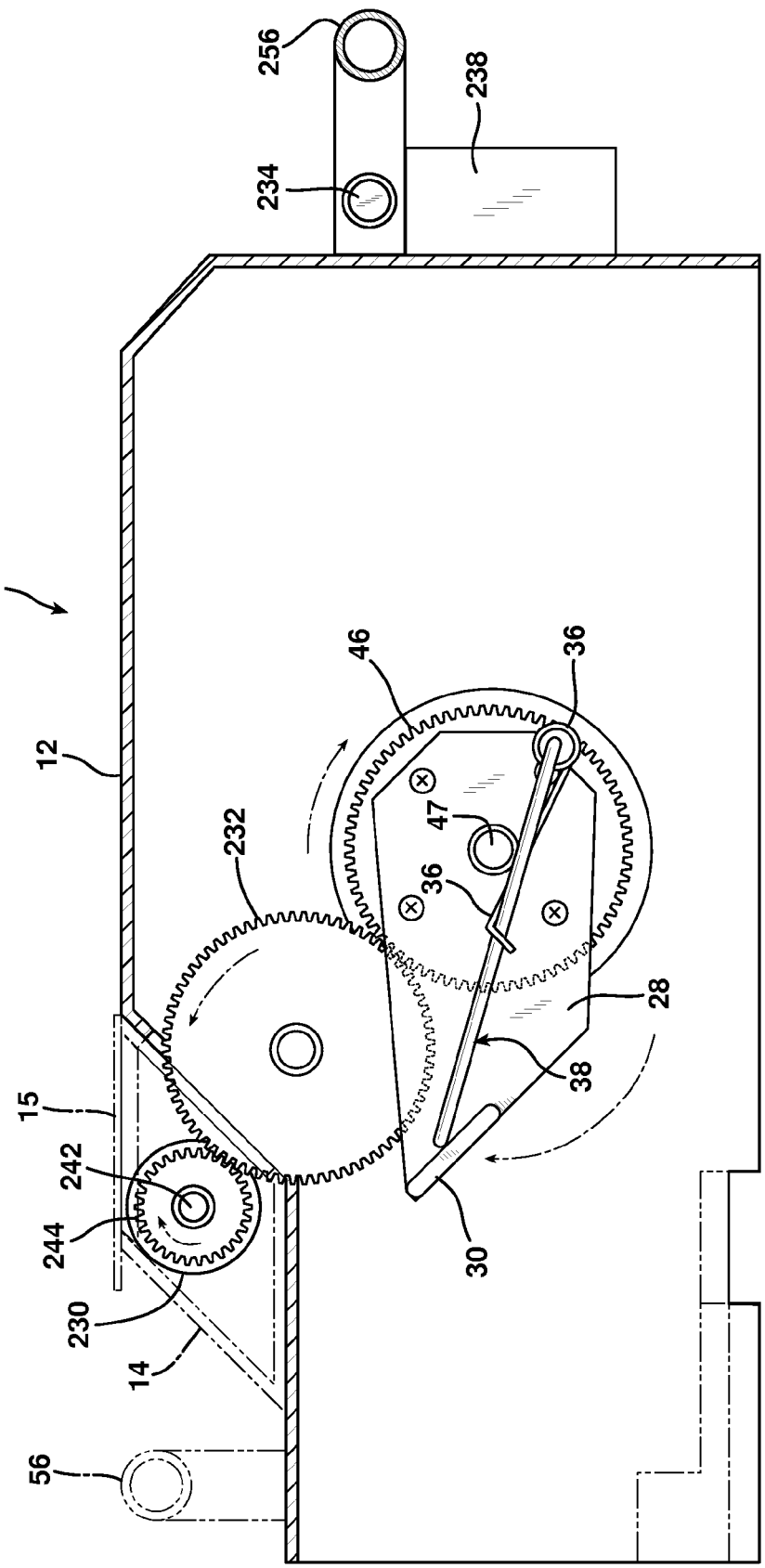
FIG. 47 is a cut-away side view of the animal trap similar to FIG. 1 wherein it has been modified to use an electric motor to activate the trap for catching an animal.
Figure 48:
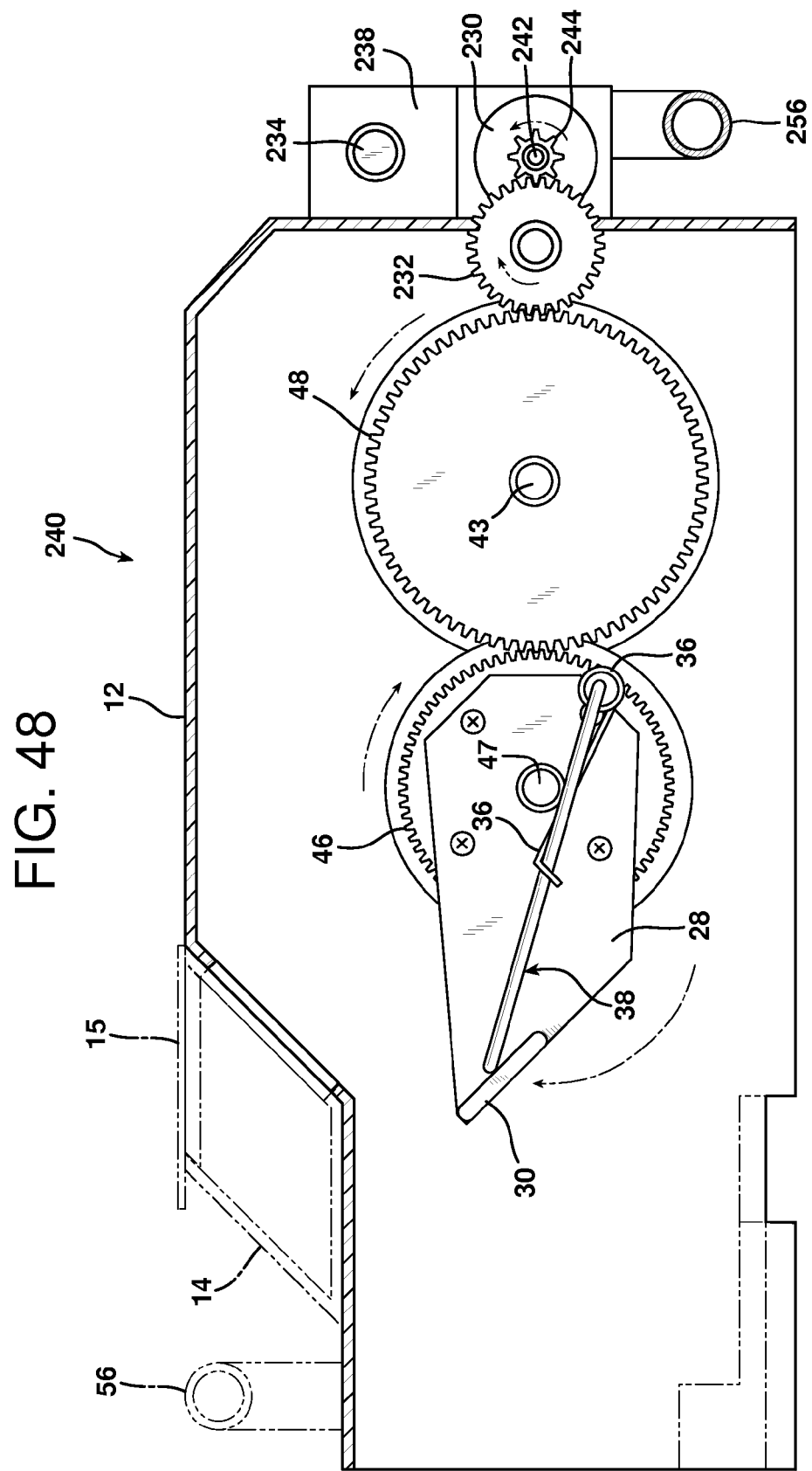
FIG. 48 is a cut-away side view of the animal trap similar to FIG. 1 showing another configuration of the use of an electric motor to activate the trap for catching an animal.

FIGS. 24-34 schematically depict several embodiments for releasing the striker arm 38 when the animal steps on the platform 26. The drawings are self explanatory when taken in conjunction with the previous statements in this specification, with the elements indicated as follows:

26 actuating platform
32 pivot point
34 counterweight beam
36 striker spring
38 striker
40 locking bar
41 shaft
42 rotating catch for striker
90 connecting rod
92 vertical strut member
94 counterweighted locking member
96 rotating counterweighted locking arm
98 pivot shaft for lock 96
100 sliding lock
102 tension roller
104 flexible connector
106 rotating lock
107 pivot shaft
108 sliding lock
112 slot
114 platform
116 bolt
138 capture slot for striker bar
156 vertical member In yet other embodiments of this invention, as depicted in FIGS. 47 and 48, instead of using a manual means to activate and release the animal from the trap, an electric motor is used.

Referring to FIG. 47, an electric motor 230 is mounted on the side of enclosure 12. In the embodiment depicted the motor 230 is mounted near the bait container 14, 15. The motor may be driven from an outlet or battery pack (not shown). The motor 230 has a motor shaft 242 having mounted thereon a drive gear 244. The electric motor 230 is activated by switch 234 located on the trap handle 256. Drive gear 244 meshes with intermediate driven gear 232 which meshes with driven gear 46. As drive gear 244 is rotated clockwise by electric motor 230, the striker 38 is raised until the striker 38 has been set and, if an animal is in the trap, the animal is released into the trash container (see also FIGS. 17A and 17B).

More specifically, and as previously described and shown in, for example FIGS. 6-12, and as shown in FIG. 47, mounted to the driven gear 46 is cocking bracket 28 that rotates in unison with driven gear 46 about shaft 47. The cocking bracket 28 extends from the driven gear 46 forward toward the open end of the trap 10 when idle. At the distal end of the bracket 28 is a flange 30 that slightly protrudes into the enclosure 12 perpendicular to the surface of the bracket 28. When the trap 10 is not set or is inactive one arm of the U-shaped striker 38 rests on the protruding bracket. When the drive gear 244 is rotated clockwise by the electric motor 230 the intermediate driven gear 232 is rotated counterclockwise and the driven gear 46 is rotated clockwise causing the bracket 28 to rotate therewith and causing the striker 38 that is engaged with the flange 30 to also rotate and raise the striker from the "kill zone" of the trap 10.

Other configurations are possible, as shown for example in FIG. 48. In this embodiment, the electric motor 230 is mounted on the rear of enclosure 12 near the handle 256. A battery pack 238 which drives the motor is also mounted to the enclosure. The motor 230 has a motor shaft 242 having mounted thereon a drive gear 244. The electric motor 230 is activated by switch 234 located on or near the trap handle 256. Drive gear 244 meshes with intermediate driven gear 232 which meshes with driven gear 48 which meshes with driven gear 46. As drive gear 244 is rotated counter-clockwise by electric motor 230, the striker 38 is raised until the striker 38 has been set.

Similar to the embodiment depicted in FIG. 47, mounted to the driven gear 46 is cocking bracket 28 that rotates in unison with driven gear 46 about shaft 47. The cocking bracket 28 extends from the driven gear 46 forward toward the open end of the trap 10 when idle. At the distal end of the bracket 28 is a flange 30 that slightly protrudes into the enclosure 12 perpendicular to the surface of the bracket 28. When the drive gear 244 is rotated counter-clockwise by the electric motor 230 the intermediate driven gear 232 is rotated clockwise, the driven gear 48 is rotated counter-clockwise and the driven gear 46 is rotated clockwise causing the bracket 28 to rotate therewith and causing the striker 38 that is engaged with the flange 30 to also rotate and raise the striker from the "kill zone" of the trap 10.

In another aspect of this invention, as shown in FIGS. 38-46, prior to setting the trap 10, a removable, and preferably disposable, liner 200 is inserted into the open end of the trap 10. The liner is preferably made of an inexpensive, relatively thin rigid polymer. The liner is configured to permit entry of the animal into the trap 10 and after the animal is trapped, prevent the splatter of blood and entrails from contaminating the trap. Preferably the liner is configured to have a bait container. The major benefit of such liner 200 is that the trapped animal, bait and liner may be conveniently removed and thrown away without having to touch the animal or trap. The liner may be inserted into a trap 10 which has an entrance ramp 22, as shown in, for example, FIG. 1 or into traps 10 without such ramps, as shown in FIGS. 28-44.

Figure 38:
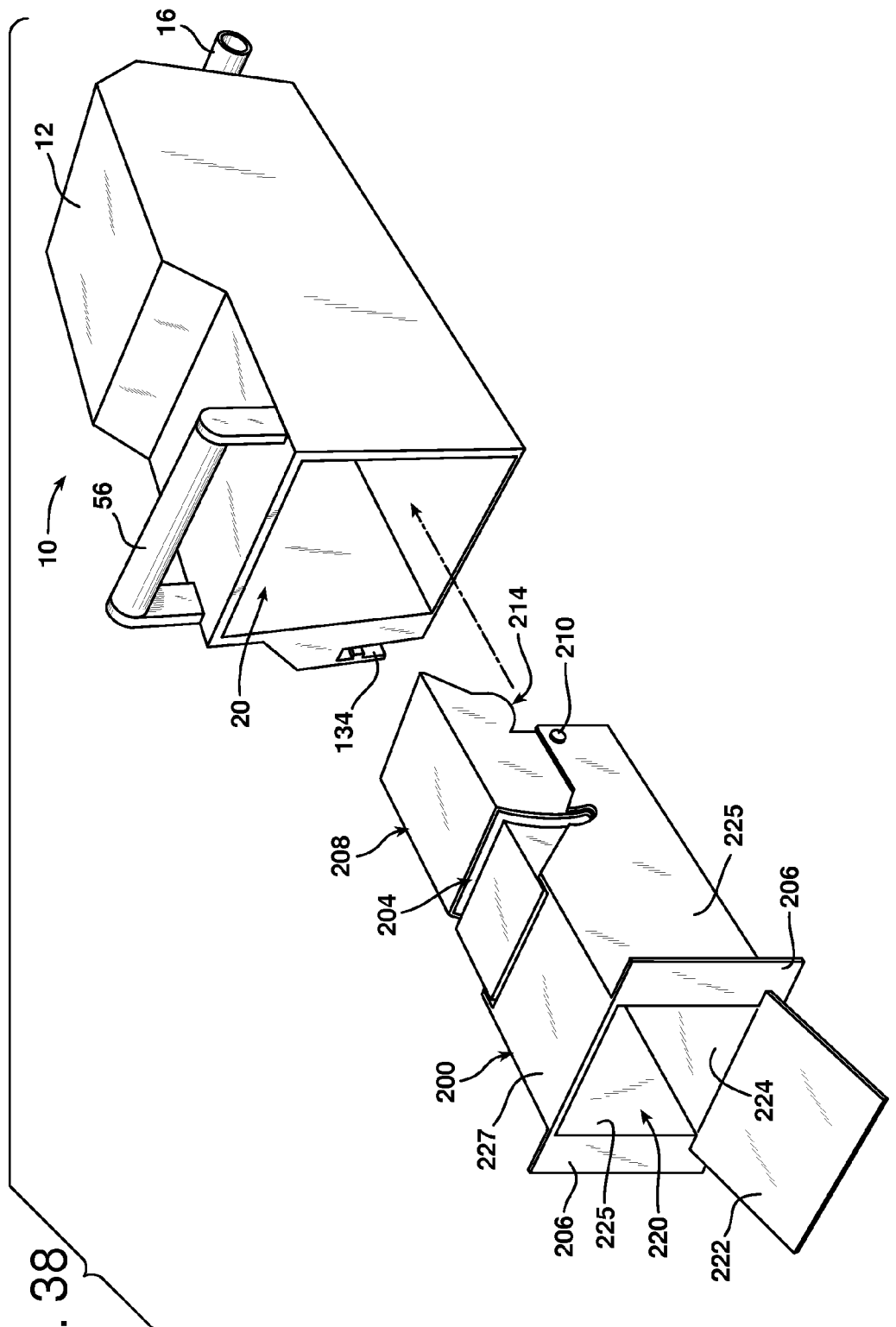
FIG. 38 is a front perspective view of the embodiment of the animal trap of this invention depicted in FIG. 1 wherein a removable, and preferably disposable, liner 200 is inserted into the opening of the trap.
Figure 46:
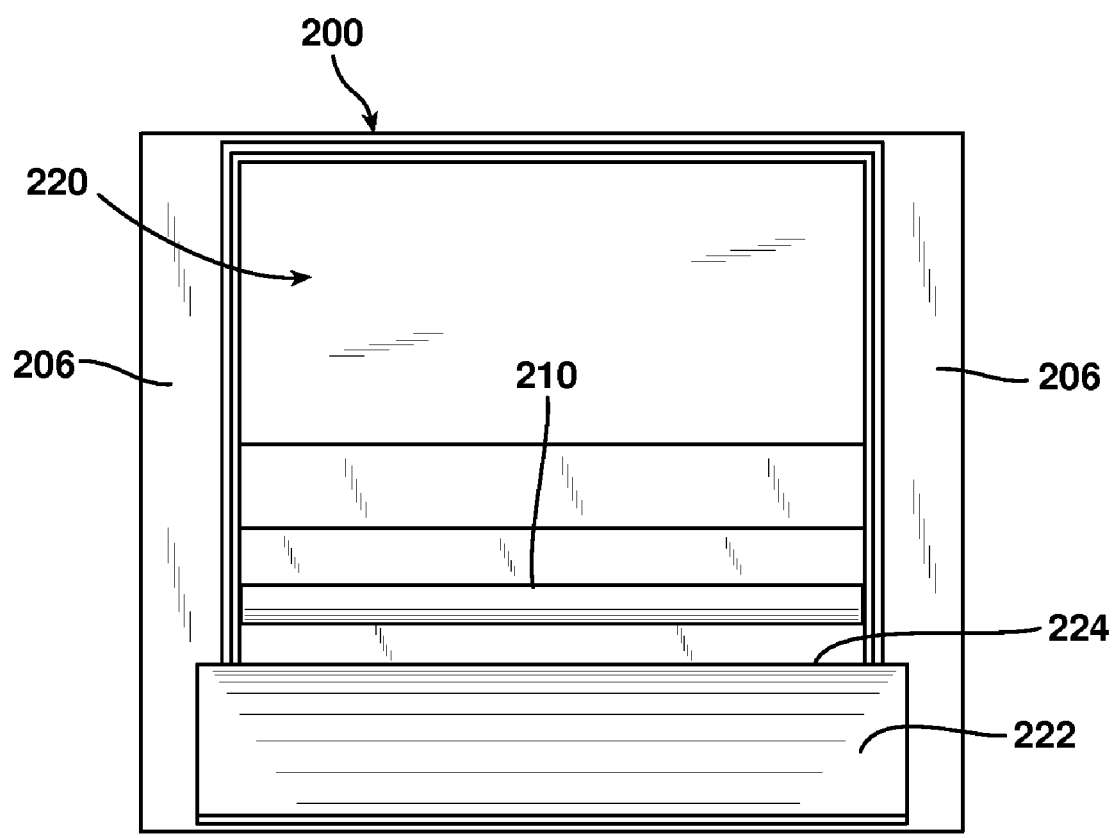
FIG. 46 is a front view of the removable liner 200 used in the animal trap of FIGS. 1 and 41.

Referring to FIG. 38, as well as the FIGS. 39-46, the removable liner 200 is inserted into the opening 20 of the trap 10. The liner 200 has a platform 224, two upstanding side walls 225 and a top wall 227. Connected to the end of the platform 224 is an entrance ramp 222 that leads through the opening 220 to the interior of the liner 200 and trap 10. The ramp 222 may have a pivot means (not shown) between the ramp 222 and platform 224 to permit the ramp 222 to pivot between an open position and a closed position. As depicted in FIG. 46 the ramp 222 and platform 224 are preferably contiguous with each other. The ramp 222 and/or platform 224 may have a textured material on portions thereof to permit the animal to obtain traction on the surface in all types of conditions, e.g., wet, rain, snow, etc. (not shown) or inclinations. The ramp 222 permits the animal 128 easy access to the interior of the trap 10. The animal merely needs to walk up the ramp into the trap 10.

Projecting outwardly from each of the sidewalls 225 at the front of the liner 200 are flanges 206. These flanges 206 prevent splatter from entering the trap 10 mechanism and assist in properly positioning the liner 200 in the trap 10 so that they can properly coact and function with each other.

Figure 39:
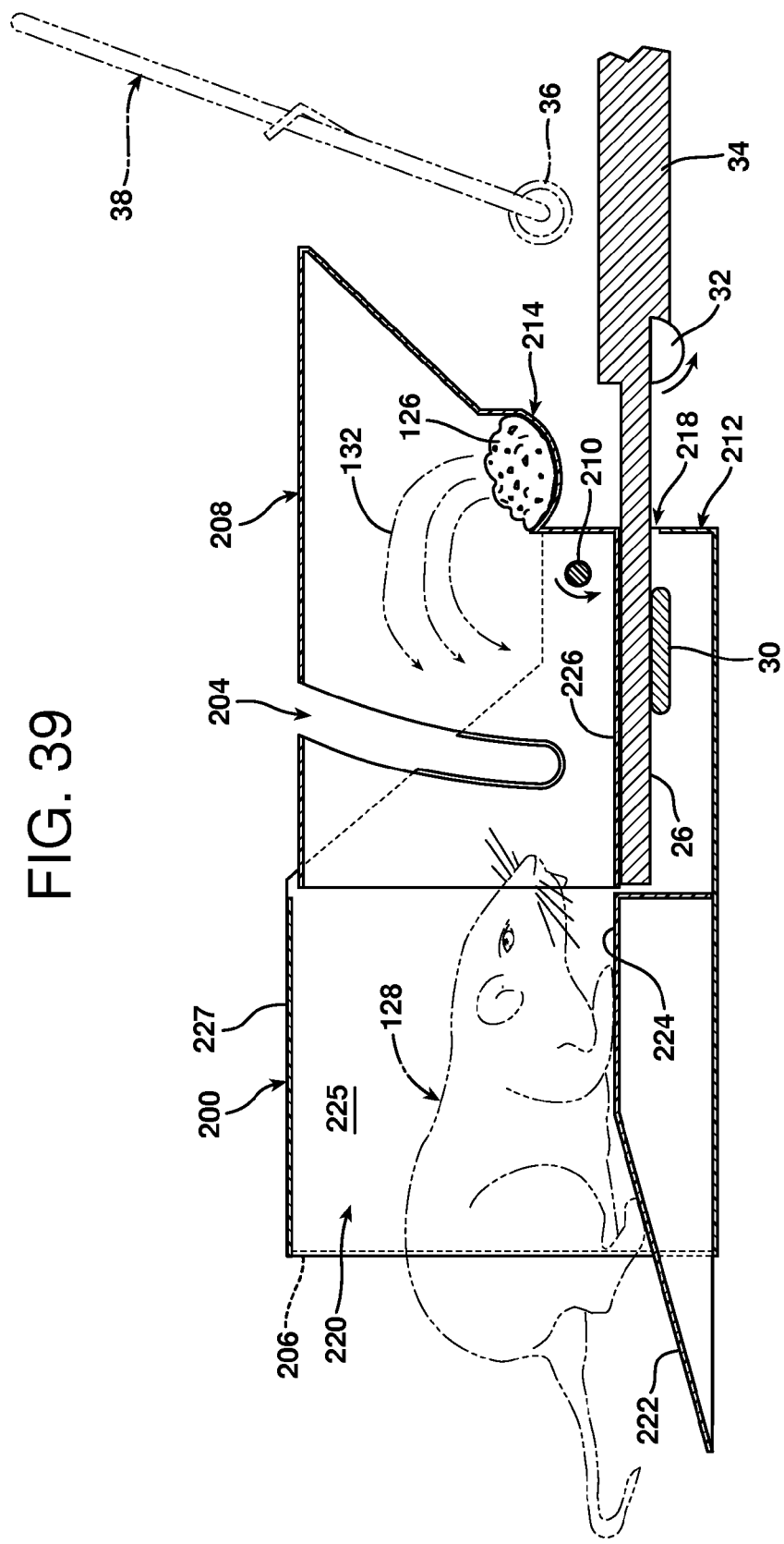
FIG. 39 is a cut-away side view of the animal trap shown in FIG. 38 having the removable liner 200 mounted therein, showing an animal therein just prior to being trapped.
Figure 44:
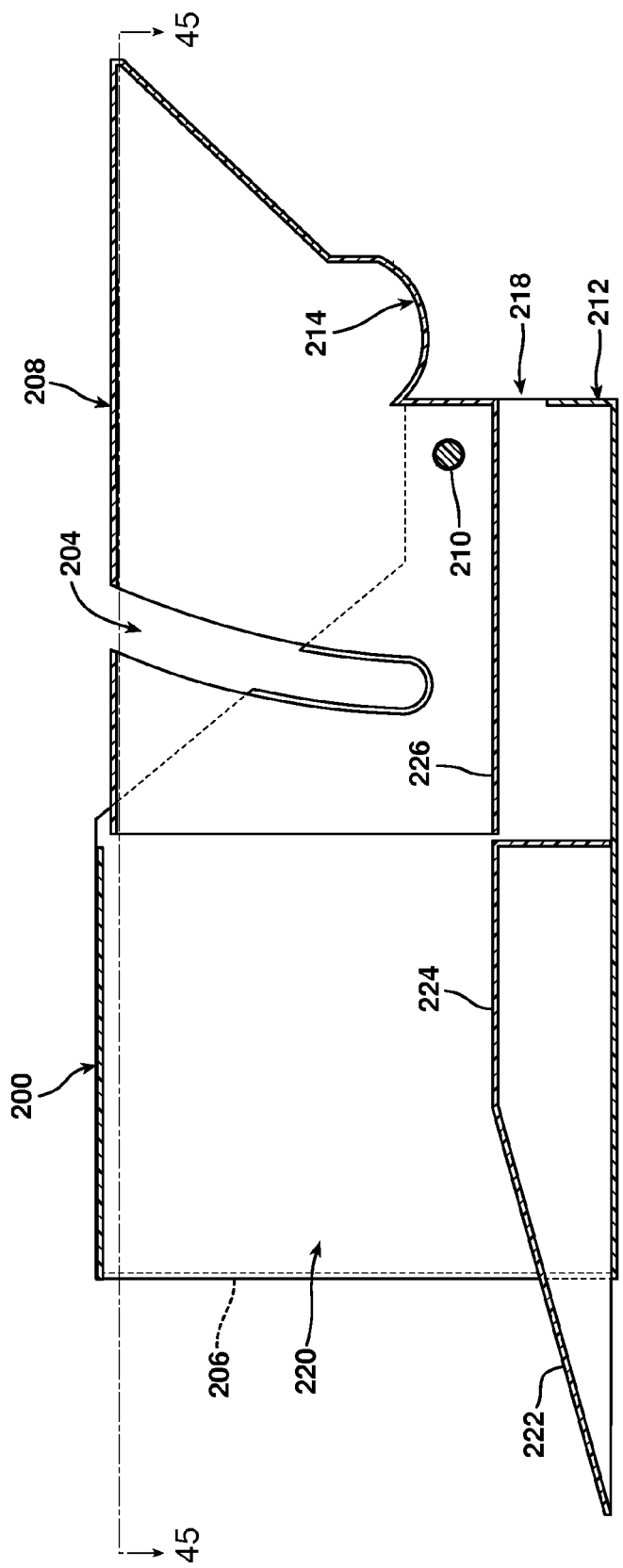
FIG. 44 is a cut-away side view of the removable liner 200 used in the animal trap of FIGS. 1 and 41.
Figure 45:
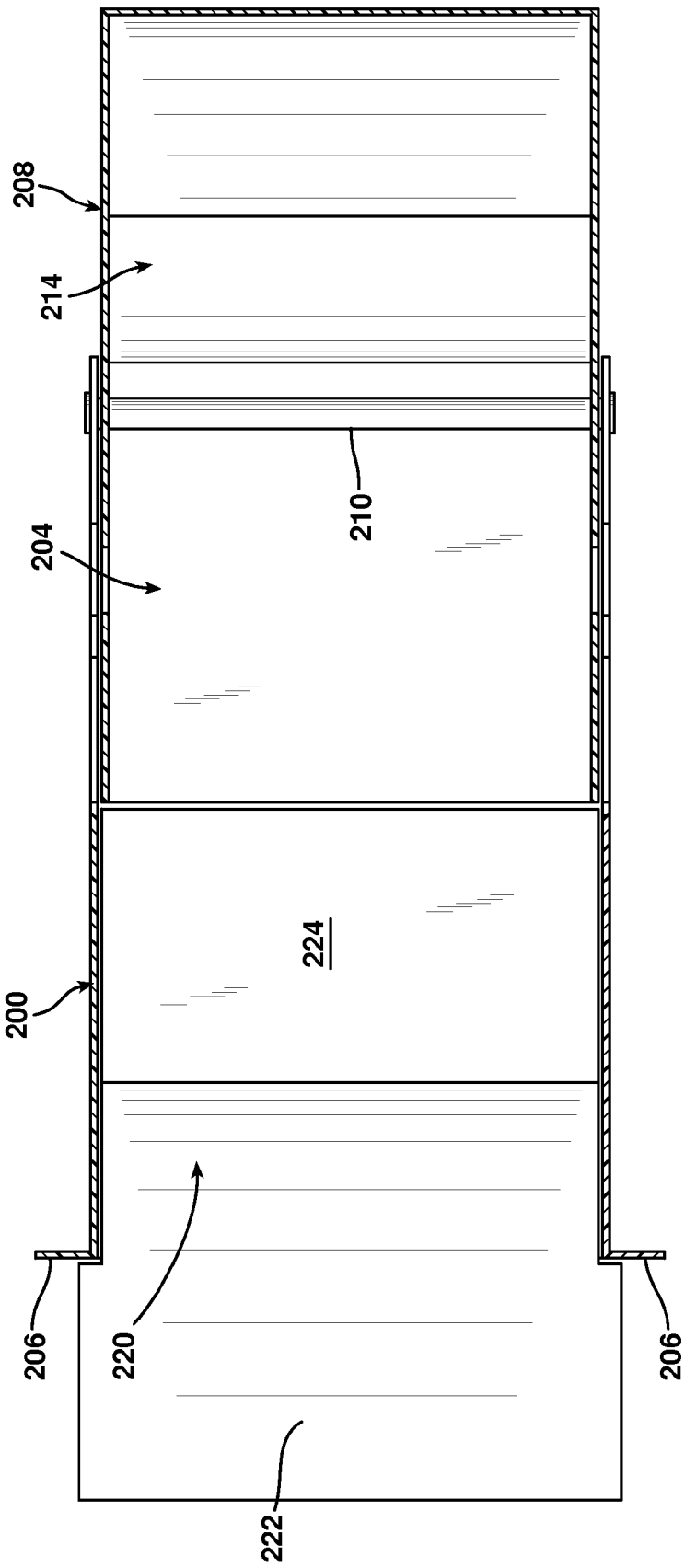
FIG. 45 is a cut-away top view of the removable liner 200 used in the animal trap of FIGS. 1 and 41.

Referring for example, to FIG. 39 and FIG. 44, at the end of platform 224, (moving toward the interior of the trap 10), is actuating platform 226 onto which the animal 128 will be led as it progresses along platform 224. Actuating platform 226 forms the bottom of a bucket 208 that pivots about pivot rod 210 that extends between the side walls 225 of the liner 200. The bucket 208 may have a bait station 214 at the end thereof to lure the animal into the trap 10. The bucket 208 is formed by the actuating platform 226, perpendicular side walls 229 and top wall 231. This bucket 208 freely pivots about pivot rod 210.

Figure 40:
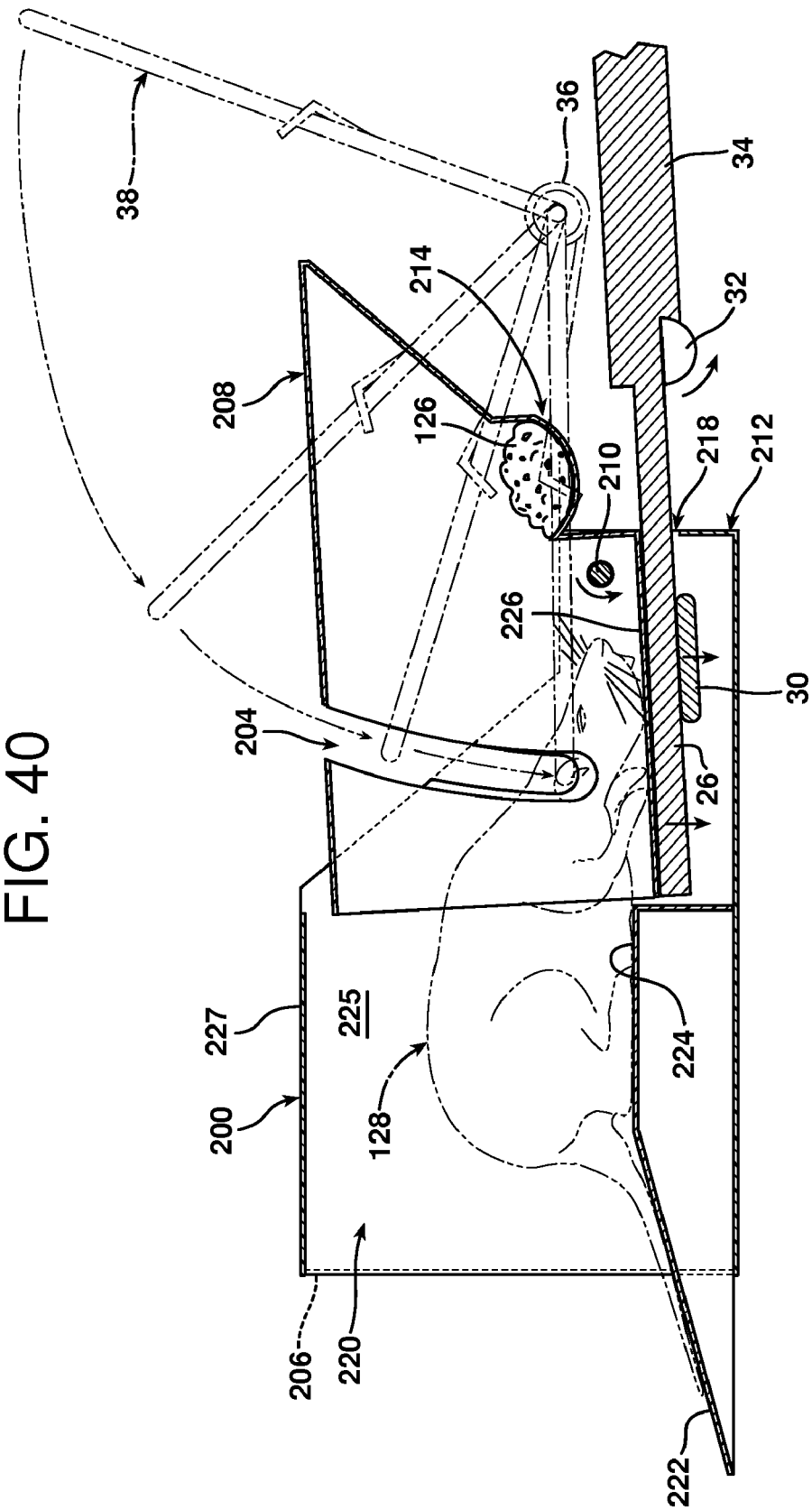
FIG. 40 is a cut-away side view of the animal trap shown in FIG. 38 having the removable liner 200 mounted therein, showing an animal therein just after being trapped.

As shown for example in FIG. 39 and FIG. 40, the actuating platform 226 rests upon the platform 26 of the trap 10. As the animal 128 enters the trap 10 and onto the actuating platform 226 the bucket 208 pivots downward about pivot rod 210 causing the platform 26 to drop displacing the counterweight beams 34 upward to cause the release of the striker 38 to catch and kill the animal 128. A slot 204 is appropriately positioned in the side walls 229 of bucket 208 to permit the free movement of striker 38 toward and away from the platforms 26, 226.

Figure 41:
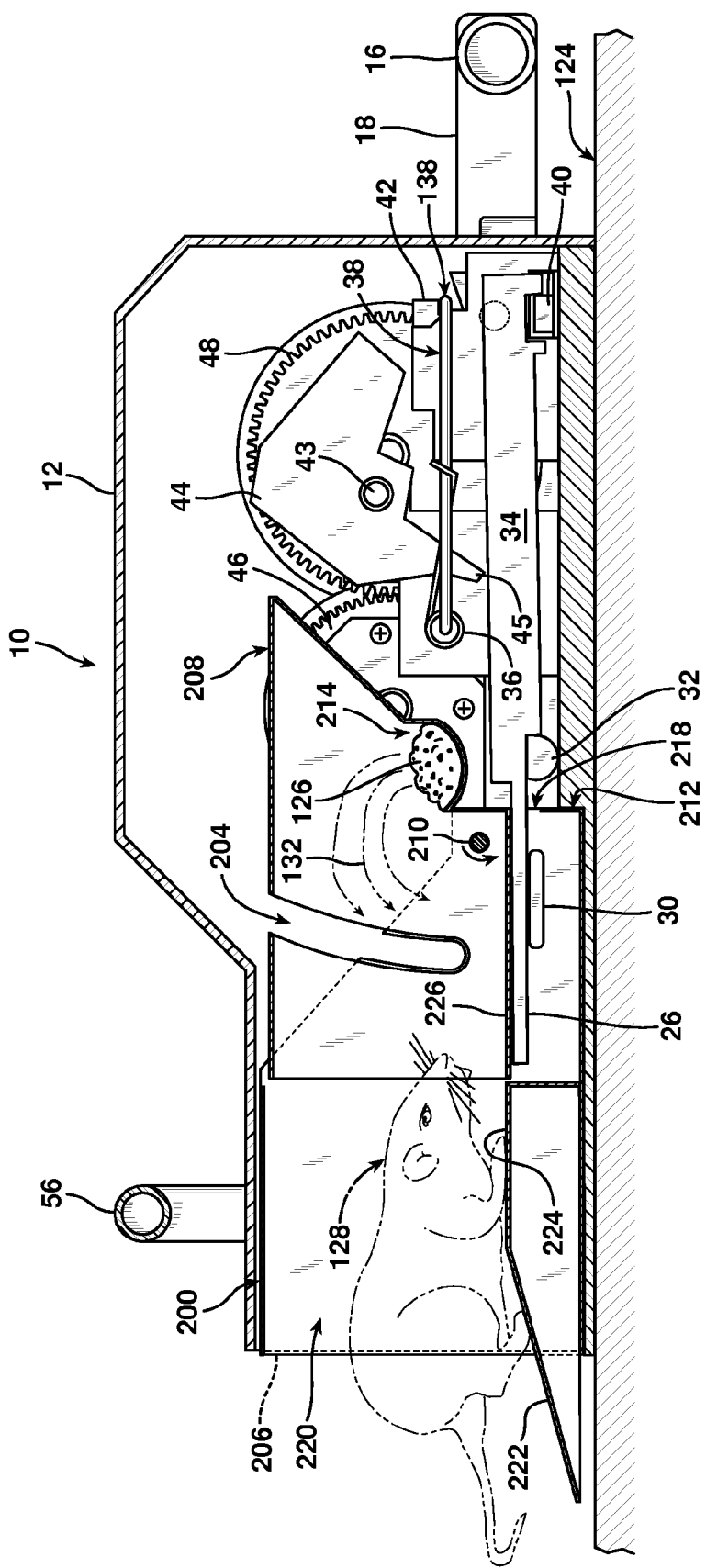
FIG. 41 is a cut-away side view of the animal trap shown in FIG. 1 having the removable liner 200 mounted therein, and showing an animal therein just prior to being trapped.
Figure 42:
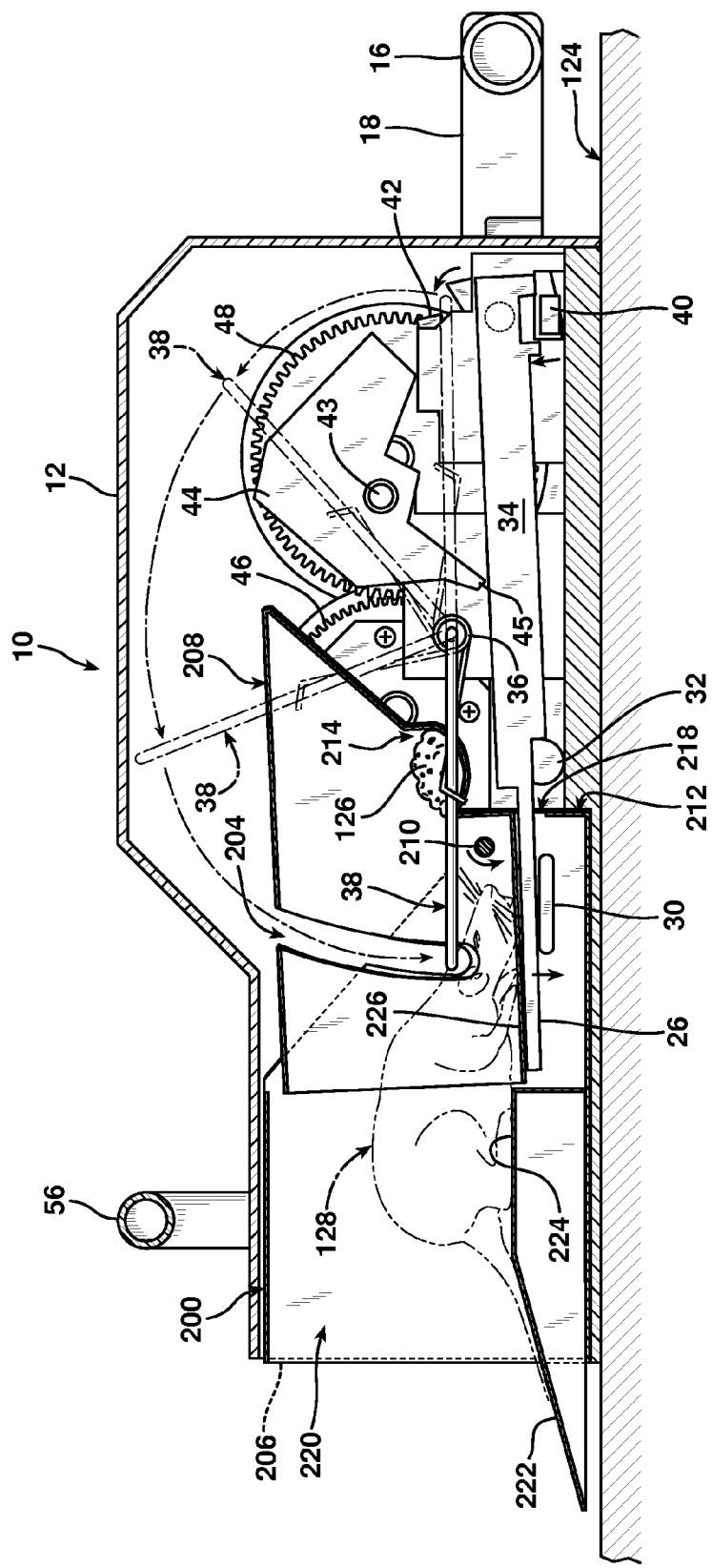
FIG. 42 is a cut-away side view of the animal trap shown in FIG. 41 having the removable liner 200 mounted therein, and showing an animal therein just after being trapped.
Figure 43:
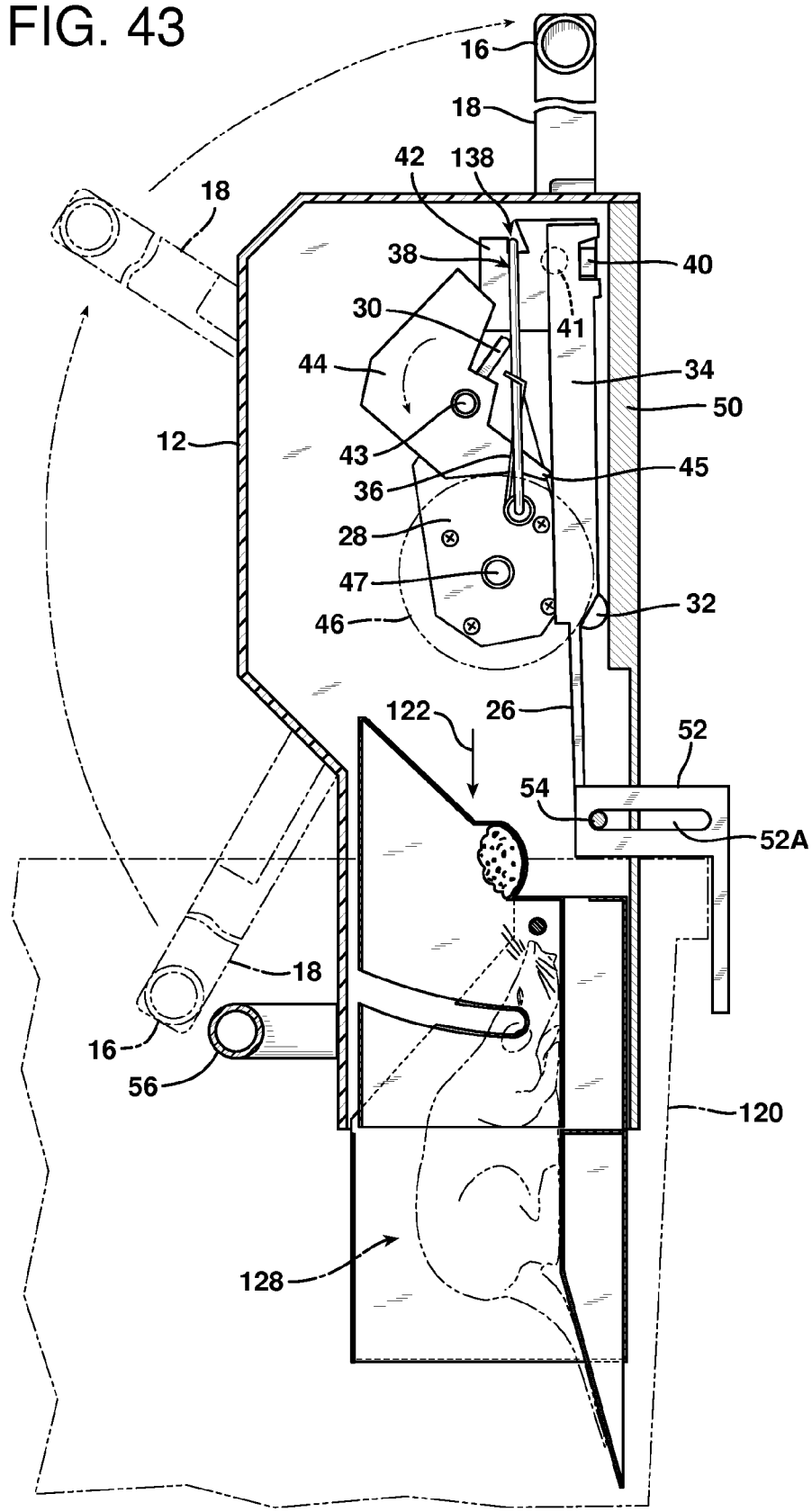
FIG. 43 is a cut-away side view taken of the animal trap shown in FIG. 41 having the removable liner 200 mounted therein demonstrating the removal of a dead animal and removable liner from the trap after being trapped and killed by the trap.

In use, the trap 10 is actuated in the afordescribed manner causing the striker 38 to be positioned as shown in FIG. 41. The liner 200, with bait 126 placed in bait station 214, is then inserted into the trap 10 as shown in FIG. 38 and positioned therein as shown in FIGS. 41 and 42 with the actuating platform 226 above activating platform 26. As the animal moves into the trap 10 it steps on the platform 226 causing the striker 38 to release killing the animal 128 (FIG. 42). As is seen in FIG. 43 the trap 10 may be emptied without the person running the risk of touching the dead animal. In order to empty the trap mechanism, the hand grip 16 to the crank 18 is rotated toward the entrance to the trap 10 and when returned to its previous position it lifts the striker bar 38 from the dead mouse and is reactivated. Consequently, the dead animal 128 and the liner 200 can drop away from the trap 10 into the trash can without the person having to touch the animal or liner or even look at the animal. The trap may then be re-baited with a new liner 200 with the striker 38 reset as shown in FIG. 41.

The improved mousetrap 10 of the present invention features many advantages that eliminate undesirable aspects generally associated with prior animal trapping devices. Foremost among these benefits is an arrangement wherein a user's hands and fingers are protected from possible entrapment by a jaw frame of the trap because of a twofold safety approach featuring a cover 12 that shields one's body from contact with the trapping mechanism in the trap and a handle 16 that allows one to easily set the trap 10 at a location which is remote from the hazardous jaw frame.

Another advantageous feature the present invention is the ability to dispose of the unsanitary captured animal without touching the animal or interior of the trap. Once sprung, a user merely lifts the entire trap 10 and using the handles 56 and 16 or by activating the electric motor 230 disposes of the dead animal 128, and liner 200 if present, while simultaneously re-setting the trap. The user not only need never view the animal, but is also spared any unsanitary manipulations of the trap which usually were previously required in order to dispose of a captured animal. The cover 12 prevents any accidental contact between the user and the dead animal 128. If the liner 200 is used the interior of the trap is maintained clean of blood, etc.

Another advantage is that the trap is only accessible for animals from one side, i.e., the front opening 20. This avoids the unintentional release of the trap when approached from the side. This increases the catch reliability and avoids injuring animals by a stray blow. As the striker will not be released unless the animal enters the trap, this reduces unnecessary strain upon the construction following unintentional releases.

The animal trap 10 of this invention, in some of the embodiments, is provided with a long externally operated hand crank 18 that provides significant leverage in setting the striker spring 36 which makes setting the trap 10 much easier than in the known traps wherein the striker is rotated or set by hand. If done through an electric motor, the trap is set and the animal removed merely by activating the electric motor 230.

The improved locking mechanism in the trap 10 holds the striker 38 more securely, in the set position thus minimizing accidental release. Additionally, the striker 38 and the activation/tripping mechanism are completely and safely covered by the traps enclosure 12.

The trap is further provided with handles 56,256 and 16 which make moving, affixing and resetting the trap 10 easy and convenient.

Still further, with the exterior bait container 14 or the liner 200 containing the bait container, and the resetting by crank 18 or by electric motor 230, both activated outside the enclosure 12 of the trap 10, there is no reason for the user to put their hands inside the trap, thus minimizing or even eliminating injuries from the accidental tripping of the striker 38.

Additionally, as is seen in FIGS. 17A and 17b the trap 10 may be emptied without the person running the risk of touching the dead animal. In order to empty the trap mechanism, the hand grip 16 to the crank 18 is rotated toward the entrance to the trap 10 or by the electric motor 230 and when returned to its previous position it lifts the striker bar 38 from the dead mouse and is reactivated. Consequently, the dead animal 128 can drop away from the trap 10 into the trash can without the person having to touch the animal or even look at it. The trap may then be re-baited if necessary with the striker 38 reset as shown in FIG. 17B.

The trap bait container makes it easy to set the bait and it is possible to use bigger and more odourous baits than in existing traps and the bait is inaccesible to the animal making reuse of the bait possible. The bait container also alleviates the deposit of bait remains on the trap which is not only unhygienic but can impair the working mechanism.

The sliding attachment bracket 52 allows placement of the trap 10 onto the rim of a trash can 120 where the extension and rotation of the crank 18 releases the dead animal into the trash can 120 and resets the trap in one motion.

The foregoing constitutes a description of specific embodiments showing how the invention may be applied and put into use. These embodiments are only exemplary. The invention in its broadest, and more specific aspects, is further described and defined in the claims which now follow.

What is claimed is:

1. An animal trap comprising:
   a base having an upper surface, a bottom surface, a front portion, a portion and opposed sides;
   a jaw frame pivotally mounted on the upper surface of the base for pivotal movement between a cocked position proximate the rear portion of the base and a sprung position proximate the front portion of the base;
   a spring means for biasing the jaw frame towards the sprung position;
   a gear system mounted proximate one of the opposed sides of the base comprising a drive gear and driven gear cooperatively engaged with each other, wherein the driven gear is releasably engaged to the jaw frame when the jaw frame is in the sprung position;
   a lever means for selective engagement with the drive gear;
   a means for selectively engaging and disengaging the lever means from the drive gear;
   whereby when the lever means is selectively engaged to the drive gear and is rotated from the rear portion to the front portion of the base, the drive gear is rotated toward the front causing the driven gear to rotate toward the rear to thereby pivot the jaw frame to the cocked position proximate the rear portion of the base;

whereby when the lever means is selectively disengaged from the drive gear, the lever means can be freely rotated from the front portion of the base to the rear portion of the base for repositioning the lever means for selective engagement with the drive gear;

a catch means for releasably engaging the jaw frame when the jaw frame is rotated to the cocked position, wherein when the jaw frame is engaged by the catch means, the jaw frame is cooperatively disengaged from the driven gear;

a trigger member mounted to the upper surface of the base proximate the front portion of the base and adapted for operative association with the catch means to force the catch means to release the jaw frame permitting the jaw frame to move to the sprung position when an animal steps on the trigger member to thereby trap the animal between the jaw frame and the upper surface of the front portion of the base and to releasably engage the driven gear;

whereby when the lever means is again selectively engaged with the drive gear, the jaw frame may be pivotally moved to the cocked position to simultaneously release the animal from the trap and cock the jaw frame;

an enclosure means having an interior and an exterior surface mounted to the base for enclosing the trigger member and the catch means in the interior and having an opening in the enclosure to the interior, the enclosure being proximate the trigger member to permit the animal to enter the interior of the enclosure and step on the trigger member to spring the jaw frame to trap the animal between the jaw frame and the upper surface of the front portion of the base.

2. The trap of claim 1, wherein the drive gear and driven gear are rollers that are frictionally cooperatively engaged to each other.

3. The trap of claim 1, wherein the drive gear and driven gear each have teeth around a periphery thereof that cooperatively engage with the teeth of the other gear by a meshing of their respective teeth.

4. The trap of claim 1, wherein the lever means is slidably mounted to a side of the drive gear and includes a handle at one end of the lever means and the means for selectively engaging and disengaging the lever means from the drive gear at the other end of the lever means, the lever means being slidable on the drive gear from an inactive unextended position wherein the lever means is selectively disengaged from the drive gear and an extended active position wherein the lever means is selectively engaged to the drive gear, whereby when the lever means is selectively engaged to the drive gear and rotated from the rear portion of the base to the front portion of the base the drive gear is rotated toward the front causing the driven gear to rotate toward the rear portion of the base to thereby pivot the jaw frame to the cocked position proximate the rear portion of the base.

5. The trap of claim 1, further comprising a bait container mounted to the exterior surface of the enclosure proximate the trigger member, the bait container having an interior volume for enclosing bait, the interior volume being in air communication with the interior of the enclosure enabling the bait to be smelled by the animal when approaching the opening of the enclosure to thereby lure the animal onto the trigger member.

6. The trap of claim 5, further comprising a removable cap on an opening in the bait container for insertion of bait into the container.

7. The trap of claim 1, wherein the trigger member is a platform cooperatively associated with the catch means to force the catch means to release the jaw frame, wherein when the jaw frame is in the cocked position in the catch means the platform is spaced above the upper surface of the base and when an animal steps on the platform it forces the platform to move toward the upper surface of the base forcing the catch means to release the jaw frame to thereby trap the animal between the jaw frame and the platform.

8. The trap of claim 1, further comprising a bracket means mounted to the base for securing the trap to a support member.

9. The trap of claim 1, further comprising a bracket means mounted to the base for securing the trap to a container for disposing of the trapped animal.

10. The trap of claim 1, further comprising a bracket means mounted to the base and slidable between a first position wherein the bracket is substantially flush with the bottom surface of the base and a second position wherein the bracket extends from the bottom surface of the base for securing the trap to a support member.

11. The trap of claim 1, further comprising a removable liner for insertion in the enclosure, the liner including a floor and surrounding walls that protect an interior surface of the enclosure, the trigger member and catch means, the liner floor coacting with the trigger member and jaw frame, wherein when the animal enters the interior of the enclosure and steps on the liner floor, the liner floor coacts with the trigger to activate the trigger member to spring the jaw frame to trap the animal between the jaw frame and the liner floor.

12. The trap of claim 11, wherein the liner further includes a bait container mounted to one of the liner walls proximate the trigger member, the bait container having an interior volume for enclosing bait, the interior volume being in air communication with the interior of the enclosure enabling the bait to be smelled by the animal when approaching the opening of the enclosure to thereby lure the animal onto the liner floor.

13. The trap of claim 11, whereby when the lever is again selectively engaged with the drive gear, the jaw frame may be pivotally moved to the cocked position to simultaneously release the animal and liner from the trap and cock the jaw frame.

* * * * *